US008707261B2

(12) United States Patent
Heller et al.

(10) Patent No.: US 8,707,261 B2
(45) Date of Patent: Apr. 22, 2014

(54) SERVICE INTEGRATION MODELING AND EXECUTION FRAMEWORK

(75) Inventors: Markus Heller, Bretten (DE); Matthias Allgaier, Langenau (DE)

(73) Assignee: SAP AG, Walldorf (DE)

( * ) Notice: Subject to any disclaimer, the term of this patent is extended or adjusted under 35 U.S.C. 154(b) by 1099 days.

(21) Appl. No.: 12/708,994

(22) Filed: Feb. 19, 2010

(65) Prior Publication Data

US 2011/0208788 A1 Aug. 25, 2011

(51) Int. Cl.
*G06F 9/44* (2006.01)
(52) U.S. Cl.
USPC .......................................... 717/121; 717/120
(58) Field of Classification Search
None
See application file for complete search history.

(56) References Cited

U.S. PATENT DOCUMENTS

| | | | | |
|---|---|---|---|---|
| 5,961,620 | A * | 10/1999 | Trent et al. | 710/105 |
| 2002/0187750 | A1 * | 12/2002 | Majumdar | 455/41 |
| 2003/0074217 | A1 * | 4/2003 | Beisiegel et al. | 705/1 |
| 2008/0126474 | A1 * | 5/2008 | Beisiegel et al. | 709/203 |
| 2009/0158237 | A1 * | 6/2009 | Zhang et al. | 717/100 |

OTHER PUBLICATIONS

A.P. Barros and M. Dumas, "The Rise of Web Service Ecosystems," IT Pro, Sep./Oct. 2006, pp. 31-37.
D. Birsan, "On Plug-ins and Estensible Architectures," QUEUE, Mar. 2005, pp. 40-46.
A. Hevner, T.M. Salvatore, J. Park, and S. Ram, "Design Science in Information Systems Research," MIS Quarterly vol. 28, No. 1, pp. 75-105, Mar. 2004.
C. Janiesch and R. Ruggaber, "Eine Infrastruktur für das Internet der Dienste," HMD-Praxis der Wirtschaftsinformatik 45 (261): 71-79. 2008.
H. Lo, R. Wang, and J-P Garbani, "The State of Enterprise Software 2009," Forrester Research, Jun. 5, 2009.
N. Mulyar, W MP van der Aalst and N. Russell, "Process Flexibility Patterns," BETA Working Paper Series, WP 251, Eindhoven University of Technology, 2008.
S. Overhage, K. Turowski "Serviceorientiere Architekturen—Konzept and methodische Herausforderungen," In: Nissen V. Petsch M. Schorcht H. (Hrsg) Service-orientierte Architekturn. Chancen and Herausforderungen bei der Flexibilisierung und Intergration von Unternehmensprozessen. Deutscher Universitatsverlag, Wiesbaden. 2007.
B. Weber, M. Reichert, S. Rinderle-MA, "Change Patterns and Change Support Features—Enhancing Flexibility in Process-Aware Information Systems," DKE 66 (3): 438-466. May 9, 2008.

(Continued)

*Primary Examiner* — Lewis A Bullock, Jr.
*Assistant Examiner* — Keith C Yuen
(74) *Attorney, Agent, or Firm* — Fountainhead Law Group PC

(57) ABSTRACT

In one embodiment, a method for integrating a service into an application is provided. The method determines an application extensibility description for an application. The application extensibility description includes a set of application extension points. The method determines a service description for a service, the service description including a set of service elements. An adaptation pattern is determined and includes a first port connected to an application extension point in the set of application extension points and a second port connected to a service element in the set of service elements. A computing device generates an integration description based on the adaptation pattern having the first port connected to the application extension point and the second port connected to the service element. The integration description allows the application to be adapted or extended with the service.

20 Claims, 33 Drawing Sheets

(56) References Cited

OTHER PUBLICATIONS

R. Wolfinger, S. Reiter, D. Dhungana, P. Grunbacher, H. Prahofer, "Supporting Runtime System Adaptation through Product Line Engineering and Plug-in Techniques," In: 7th IEEE International Conference on Composition-Based Software systems (ICCBSS'08), Madrid. 2008.

C. Bussler, "B2B Integratiaon: Concepts and Architecture," Oracle Corporation, 2003.

G. Hohpe, B. Woolf, "Enterprise Integration Patterns—Designing, Building, and Deploying Messaging Solutions," Addison-Wesley Professional, Boston, 2003.

R. Studer, S. Grimm, and A. Abecker, "Semantic Web Services: Concepts, Technologies and Applications," Springer, Berlin, 2007.

Michael P. Papazoglou, "Web Services: Principles and Technology," Pearson-Prentice Hall, INFOLAB/CRISM, Tilburg University, The Netherlands. 2008.

A. Bolour, "Notes on the Eclipse Plug-in Architecture," Internet citation, Jul. 3, 2003, retrieved from the Internet: URL: http://www.eclipse.org/articles/Aritcle-Plug-in-architecture/plugin_architecture.html.

Extended European Search Report (from a corresponding foreign application), EP 11001059.2, mailed Sep. 11, 2011.

* cited by examiner

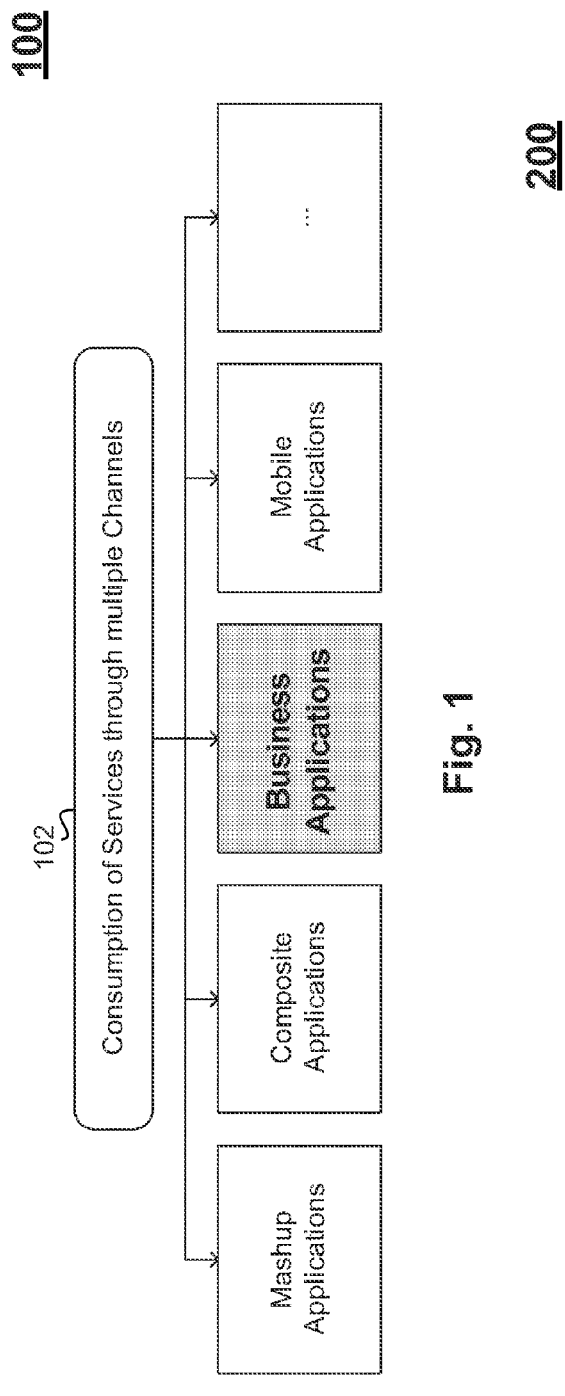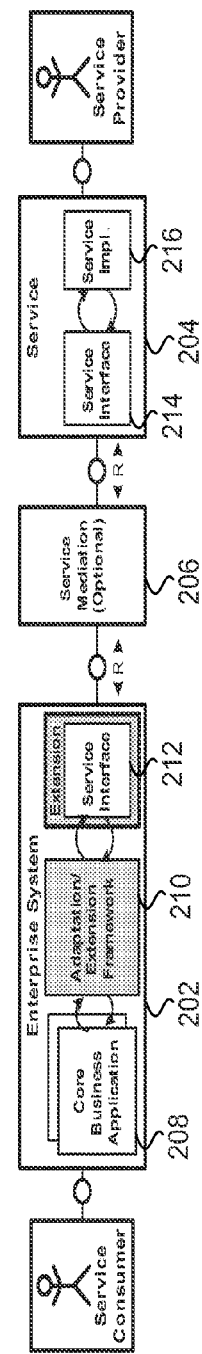

| Complex Pattern | Port Name | Atomic Pattern | Port Name | Port Category | Port Type | Port Parameterization |
|---|---|---|---|---|---|---|
| Stateless UI Service Integration without Data Persistency | A1 | AddButton | B1 | Application Reference Port | Extension Point Type - Button Panel | EP - BP-EP#1 |
| | A5 | | B2 | Service Reference Port | Default User Interface / Operation / Panel / Input Area / Button | Default User Interface / CalculateEcoValue / Main Container / Input Area / Button : Calculate Eco Value |
| | A6 | | B3 | Service Reference Port | Operations / Operation | Operations / Operation: CalculateEcoValue |
| | A2 | AddTableColumn | C1 | Application Reference Port | Extension Point Type - Table | EP - T-EP#2 |
| | A7 | | C2 | Service Reference Port | Default User Interface / Operation / Panel / Output Area / Label | Default User Interface / CalculateEcoValue / Main Container / Output Area / Label: Eco Value |
| | A8 | | C3 | Service Reference Port | Operations / Operation / Output Interface / List Element | Operations / Operation: CalculateEcoValue / Output Interface / List Element : Eco Values |
| | A3 | AddDataMediator | D1 | Application Reference Port | UI Component / Data Interface | UC1 / Data Interface / Export Interface |
| | A9 | | D2 | Service Reference Port | Operations / Operation / Input Interface | Operations / Operation: CalculateEcoValue / Input Interface |
| | A4 | AddDataMediator | E1 | Application Reference Port | UI Component / Data Interface | UC1 / Data Interface / Import Interface |
| | A10 | | E2 | Service Reference Port | Operations / Operation / Output Interface | Operations / Operation: CalculateEcoValue / Output Interface |
| | F1 | AddOutputField | | Application Reference Port | Extension Point Type - Panel | EP - P-EP#3 |
| | F2 | | | Service Reference Port | Default User Interface / Operation / Panel / Output Area / Label | Default User Interface / CalculateEcoValue / Main Container / Output Area / Label: Eco Value |
| | F3 | | | Service Reference Port | Operations / Operation / Output Interface / List Element | Operations / Operation: CalculateEcoValue / Output Interface / List Element : Eco Values |

Fig. 9

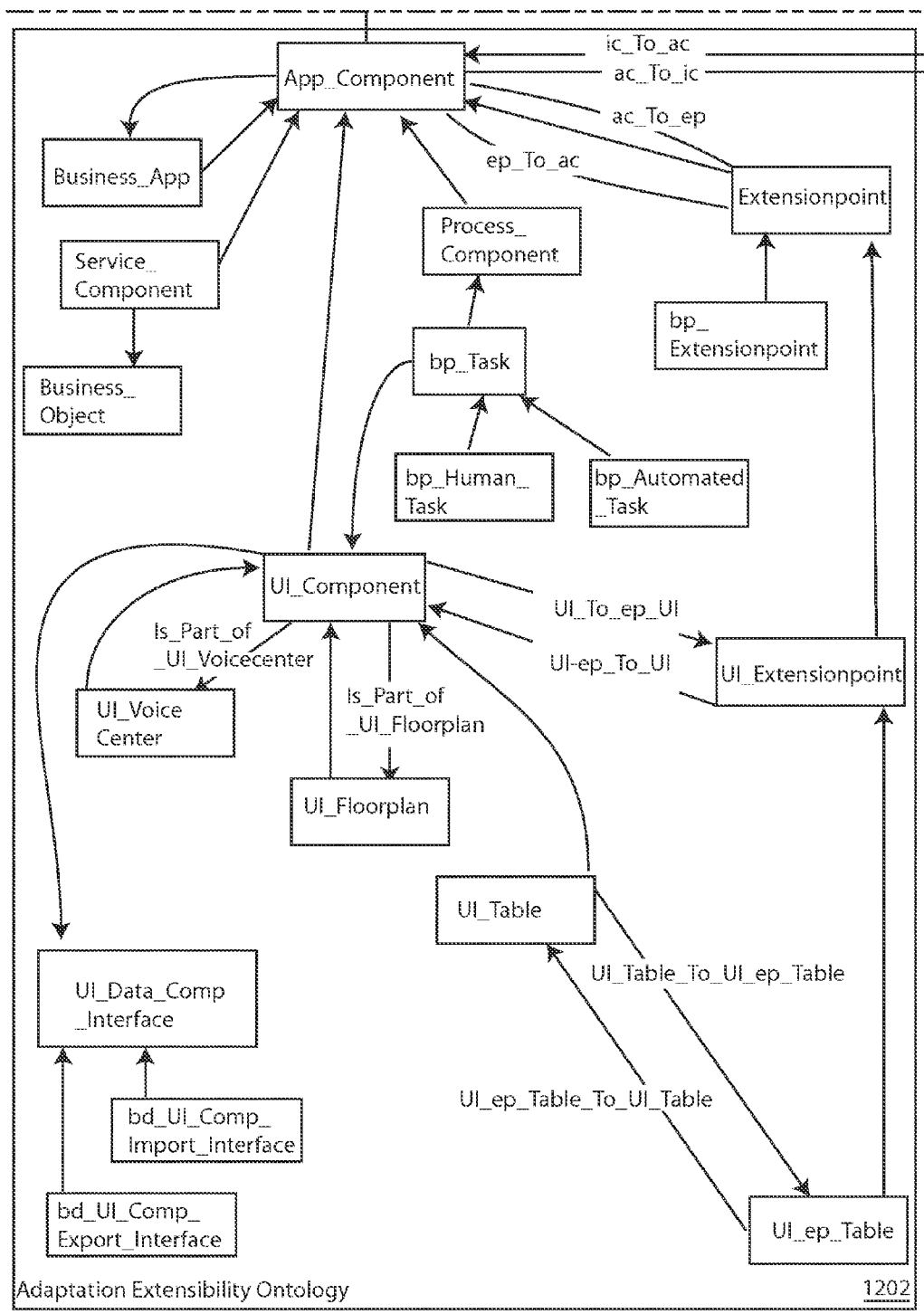
FIG. 13A2

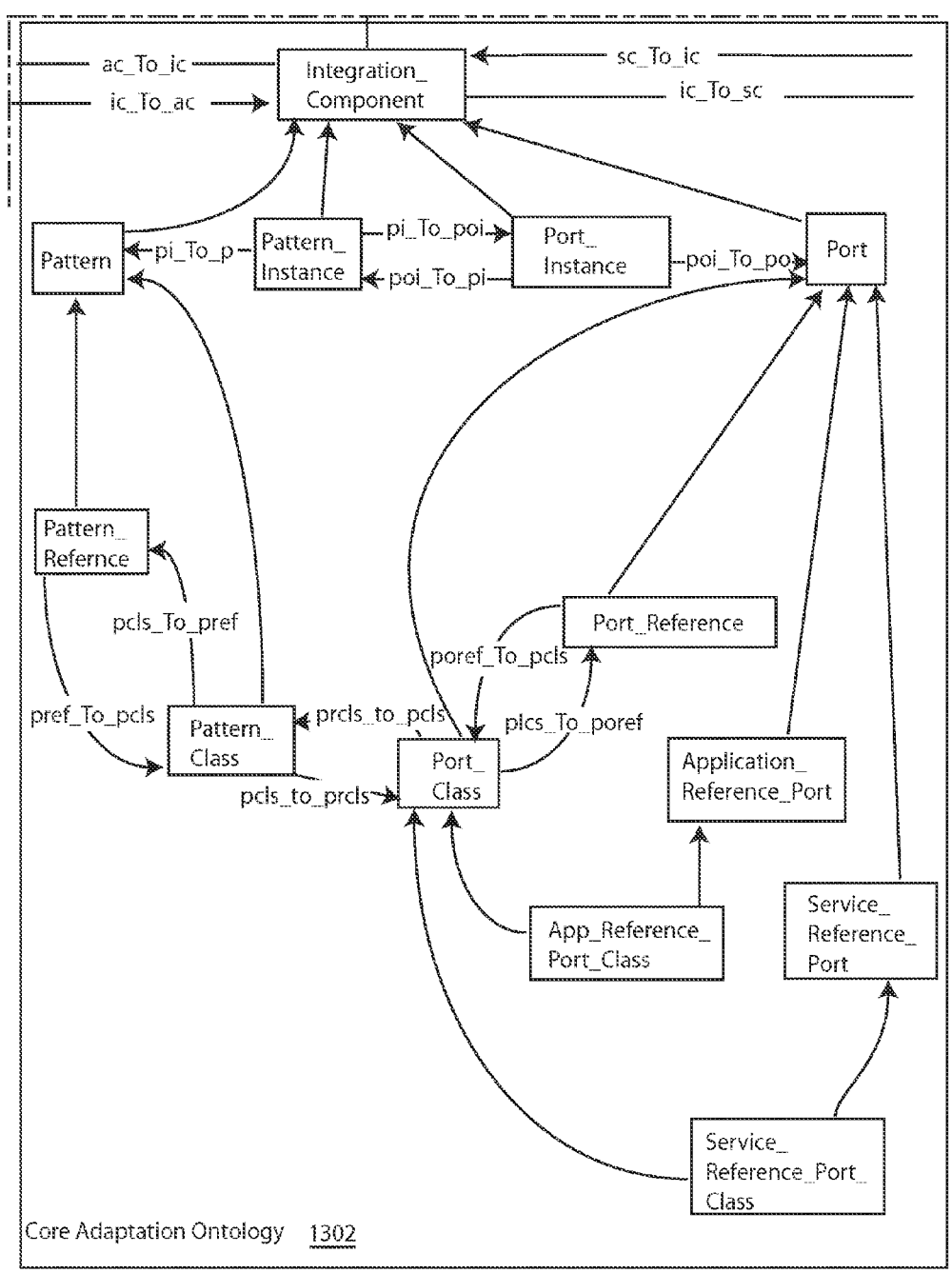
FIG. 13A3

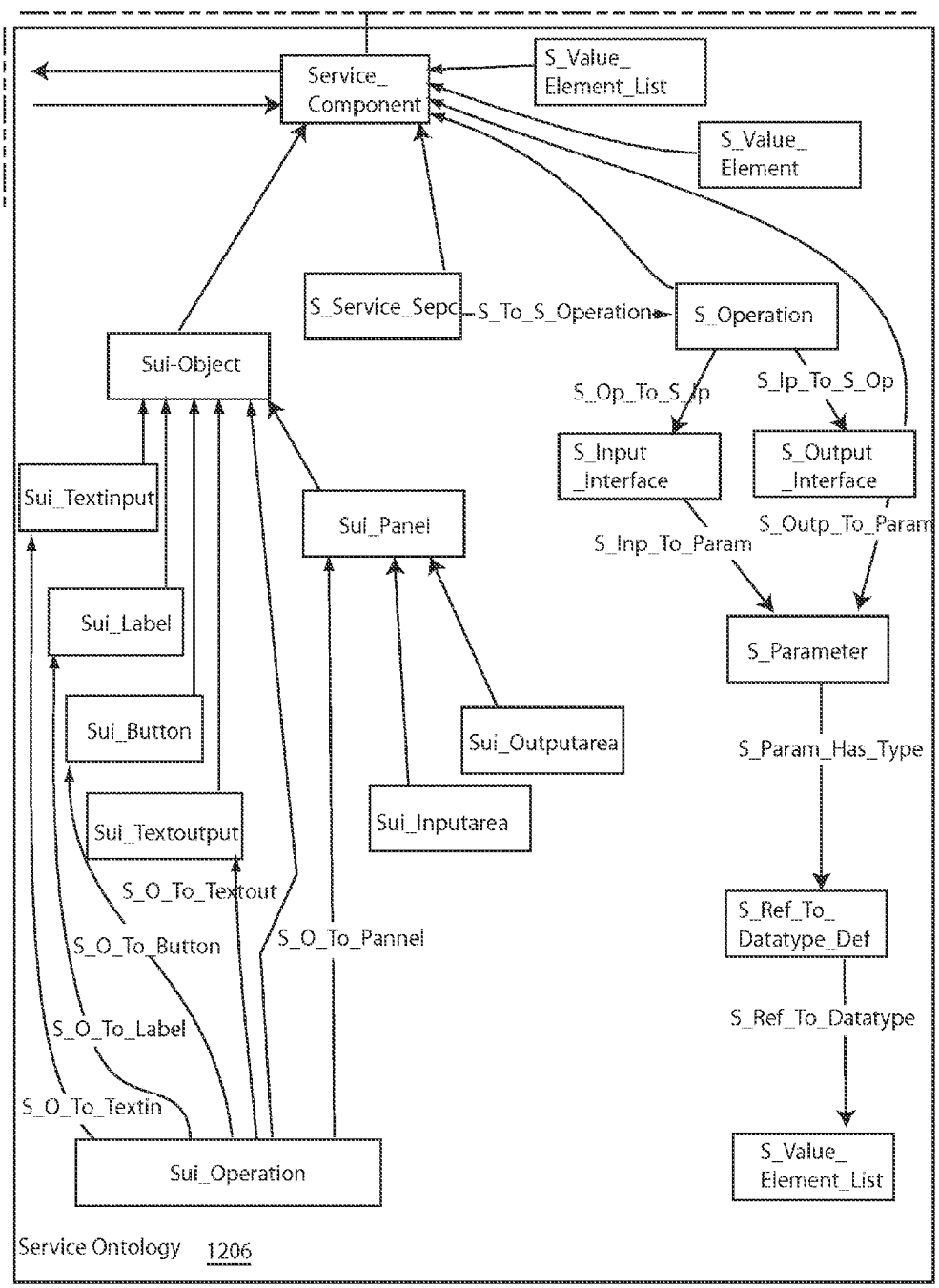
FIG. 13A4

SERVICE INTEGRATION MODELING AND EXECUTION FRAMEWORK

BACKGROUND

The present invention relates to computer programming, and in particular, to a service integration framework.

Services could be tradable similar to manufactured goods. Organizations dynamically interact as service consumers and service providers making use of a service marketplace to design, offer and consume services. Services (offered via the service marketplace) need to be integrated into standard business applications running within enterprise systems (e.g., ERP systems). These systems reflect the core business processes of an organization and can flexibly be enriched with complementary services.

Conventionally, the enterprise system is extended only with a service using a pre-defined service interface that has explicitly been foreseen by the enterprise system provider when the system was shipped. Examples are (de-facto) standard interfaces for Business-to-Business (B2B) or Application-to-Application (A2A) integration scenarios known from the area of Enterprise Application integration (EAI). Enterprises may desire an end-to-end service delivery scenario where services can be dynamically added as described above. However, the enterprise has to manually identify and adapt/extend the affected parts of the core business application(s) and manually integrate the service. This manual integration hinders the overall scalability of the service marketplace where multiple service providers and service consumers dynamically engage and interact.

Thus, enterprise systems only provide proprietary adaptation/extension techniques with a low level of abstraction. These techniques include many disadvantages. For example, a lot of manual effort (e.g., programming) is needed to extend the enterprise system with a new service. Different tools are needed during the integration process to perform various integration tasks, i.e., typically the overall set of integration tasks is not managed as a whole on a technical level within a single tool. Also, the high amount of needed integration skills and expertise needed limits the participation of non-experts in the integration because it is very difficult for the non-experts to plan and oversee all necessary or possible integration activities.

Also, the enterprise systems only provide proprietary (non-standardized) techniques for adaptation and extension with a low level of abstraction (e.g., proprietary code-level interfaces where additional integration code can be plugged in). Furthermore, in some cases the artifacts of the core enterprise system need to be directly changed with a negative impact on the software-lifecycle-management if no explicit extension techniques are provided. The usage of these low level adaptation and extension techniques to achieve the intended service integration is not explicitly modeled on a higher abstraction level. Typical integration activities that need to be carried out are typically provided in the form of best-practice recommendations to the experts, who then need to manually extend the core business application.

Also, the integration of unforeseen services may require the adaptation/extension of the core business application(s) on multiple application layers (e.g., on presentation- and/or business process layer). Typically, enterprise systems provide different adaptation/extension techniques on the different application layers, which requires deep knowledge of the different technologies.

SUMMARY

In one embodiment, a method for integrating a service into an application is provided. The method comprises: determining an application extensibility description for an application, the application extensibility description including a set of application extension points; determining a service description for a service, the service description including a set of service elements; determining an adaptation pattern, the adaptation pattern including a first port connected to an application extension point in the set of application extension points and a second port connected to a service element in the set of service elements; and generating, by a computing device, an integration description based on the adaptation pattern having the first port connected to the application extension point and the second port connected to the service element, the integration description allowing the application to be adapted or extended with the service.

In another embodiment, a computer system is provided comprising: one or more computer processors; and a computer readable storage medium containing instructions that when executed by the one or more computer processors are operable to: determine an application extensibility description for an application, the application extensibility description including a set of application extension points; determine a service description for a service, the service description including a set of service elements; determine an adaptation pattern, the adaptation pattern including a first port connected to an application extension point in the set of application extension points and a second port connected to an service element in the set of service elements; and generate an integration description based on the adaptation pattern having the first port connected to the application extension point and the second port connected to the service element, the integration description allowing the application to be adapted or extended with the service.

In another embodiment, a computer-readable storage medium is provided. The computer readable storage medium contains instructions that when executed by a computer system are operable to: determine an application extensibility description for an application, the application extensibility description including a set of application extension points; determine a service description for a service, the service description including a set of service elements; determine an adaptation pattern, the adaptation pattern including a first port connected to an application extension point in the set of application extension points and a second port connected to an service element in the set of service elements; and generate an integration description based on the adaptation pattern having the first port connected to the application extension point and the second port connected to the service element, the integration description allowing the application to be adapted or extended with the service.

The following detailed description and accompanying drawings provide a better understanding of the nature and advantages of the present invention.

BRIEF DESCRIPTION OF THE DRAWINGS

FIG. 1 shows a variety of service consumption channels through which services can be consumed by service consumers according to one embodiment.

FIG. 2 depicts a simplified system for a service integration framework according to one embodiment.

FIG. 9 shows other instantiations of adaptation patterns that may be used according to one embodiment.

FIGS. 13A, 13A2, 13A3, and 13A4 describe relevant meta model entities and their relationships according to one embodiment.

DETAILED DESCRIPTION

Figure 3:
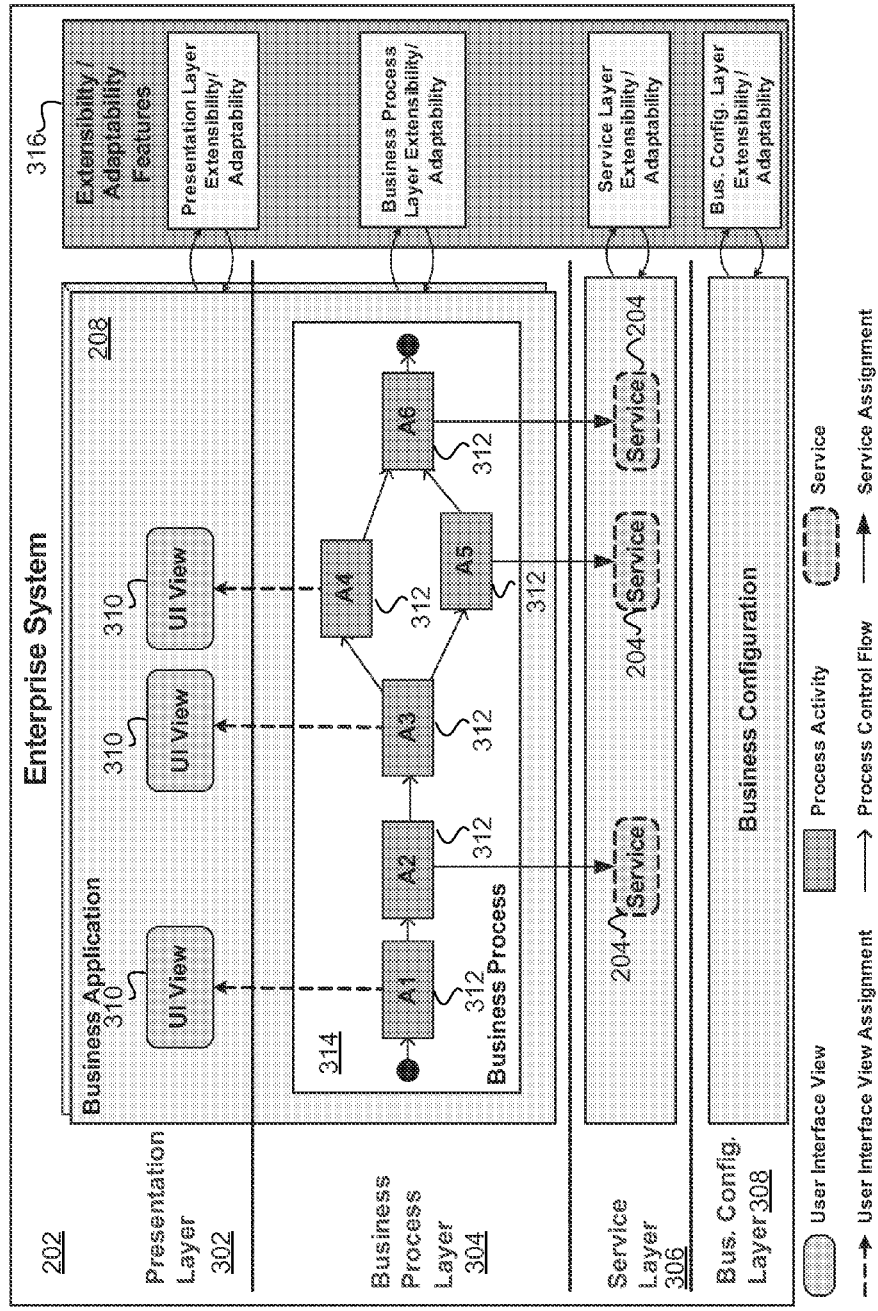
FIG. 3 shows an example of an enterprise system according to one embodiment.

Described herein are techniques for a service integration framework. In the following description, for purposes of explanation, numerous examples and specific details are set forth in order to provide a thorough understanding of embodiments of the present invention. Particular embodiments as defined by the claims may include some or all of the features in these examples alone or in combination with other features described below, and may further include modifications and equivalents of the features and concepts described herein.

Overview

Services may be consumed through a variety of channels. FIG. 1 shows a variety of service consumption channels 102 through which services can be consumed by service consumers according to one embodiment. Channels 102 include mashup applications, composite applications, business applications, mobile applications, and applications of other types are all possible consumption channel endpoints. Services may be delivered through dedicated channels and integrated into the respective core business applications, so that application users can then use these services from within the business application context.

Particular embodiments provide integration of services (e.g., services offered via a service marketplace) into standard business applications running within enterprise systems (e.g., ERP systems). This allows the core business processes of an organization to be flexibly enriched with complementary services.

FIG. 2 depicts a simplified system 200 for a service integration framework according to one embodiment. System 200 includes an enterprise system 202 and a service 204. A service mediation 206 may also be provided but is optional. Service mediation 206 may intercept and modify messages that are passed between service 204 and enterprise system 202.

A service consumer (e.g., a user) may interact with enterprise system 202 to have services performed. Enterprise system 202 includes one or more core business applications 208, an adaptation/extension framework 210, and a service interface 212. Core business application 208 may be any application, such as applications used in Business-to-Business (B2B) or Application-to-Application (A2A) integration scenarios.

Service interface 212 may be a service interface for service 204. Service interface 212 may have not been foreseen by the provider of enterprise system 202 when system 202 was shipped. Service 204 also includes a service interface 214 and a service implementation 216. Service interface 214 provides an interface to the implementation of the service offered in service 204.

Before service 204 can be used, core business application 208 of enterprise system 202 is adapted/extended on affected application layers. For example, the adaptation/extension may include adding new user interface (UI) elements (presentation layer), adding a new process step (business process layer) or extending a business object with a new field (business object layer).

Adaptation/extension framework 210 allows the adaptation/extension of core business application 208 to be compatible with service 204. The terms adaptation and extension may be used interchangeably herein. Particular embodiments provide service integration into core business applications 208 that (i) allow enterprise system providers to ship standard business applications and (ii) at the same time offer dedicated extensibility features that allows partners in a service ecosystem to seamlessly integrate new services at a later stage in the software-lifecycle. Instead of programming and installing new components into a dedicated host environment, particular embodiments provide service integration where the implementation of the service functionality may be hosted outside of the business application's enterprise system 202.

Enterprise System

FIG. 3 shows a more detailed example of enterprise system 202 according to one embodiment. Enterprise system 202 may be described with a single overall abstracted model that spans across a number (e.g., four) of abstraction layers, such as a presentation layer 302, a business process layer 304, a service layer 306 and a business configuration layer 308. Enterprise system 202 includes multiple (service-based) business applications that leverage a common service layer 306 and business configuration layer 308.

Presentation layer 302 comprises all artifacts and components for a user interface (UI) part of the business application 208. In one embodiment, UI components (UI views 310) for a dedicated UI platform with all interrelations are located within presentation layer 302. The user interface will be described in more detailed below.

Business process layer 304 contains models 312 of business processes 314 that are realized within business application 208. Modeling elements for business processes may contain references to elements on other layers. For example, a human activity in a business process can refer to a UI component 310 with the implementation of the human user interface. An automated activity can refer to a service 314 declared in the service layer 306 with the implementation of the needed business functionality.

Service layer 306 contains services 204 offered by enterprise system 202. Core services provide access to business objects. Composite services represent compositions of core services into larger bundles to provide advanced higher-value business functionality or application logic.

Business configuration layer 308 contains the configuration data for business applications 208 with available parameters and configuration options (also known as 'customizing') for business applications 208.

In order to adapt standard business applications to customer specific needs, enterprise systems 202 provide a large set of proprietary extensibility/adaptability features 316. Extensibility and adaptability covers a wide spectrum of use cases and addresses various stakeholders for flexibility requirements like customers (e.g., extensibility/flexibility as customer self-service), verticalization and globalization or partners in a software eco system.

Particular embodiments provide the integration of unforeseen services into enterprise systems 202 and the required extension/adaptation techniques for this case. While integrating a service into core business application 208, extension or adaptation tasks on different applications layers (e.g., layers 302-208 of FIG. 3) of the core business application 208 might be required. Table 1 summarizes examples of service integration related extension/adaptation tasks:

TABLE 1

Example service integration related extension/adaptation tasks

Presentation Layer Extensibility/Adaptability

Add a new button to an existing UI component
Add a new menu item to an existing menu
Add a new table column to an existing table
Add a new table to an existing UI component
Add a new input field to an existing UI component
Add a new output field an existing UI component
. . .
Business Process Layer Extensibility/Adaptability Insert a new automated activity into a core process model
Insert a new human activity into a core process model TABLE 1-continued Example service integration related extension/adaptation tasks Insert a new data flow element into a core process model
Insert a new control flow element into a core process model
. . .
Service Layer Extensibility/Adaptability Add a new field to an existing business object
Extend an existing service with an additional field or operation
Integration Logic of new service needs to access existing services
Integration Logic of new service needs to read local data (via service call)
Integration Logic of new service needs to write local data (via service call)
. . .
Business Configuration Layer Extensibility/Adaptability Change business configuration parameter value
Add a new business configuration parameter
. . .
Service Mediation Add a new data mediator to bridge structural mismatches between two data interfaces
Add a new process mediator to bridge behavior mismatches between a process of the core business application and the service to be integrated
. . .

Table 1 only shows a subset of possible extension/adaptations tasks and the list is not exhaustive. Also, existing adaptation/extension techniques of enterprise systems 202 may be reused.

Framework Architecture

Figure 4:
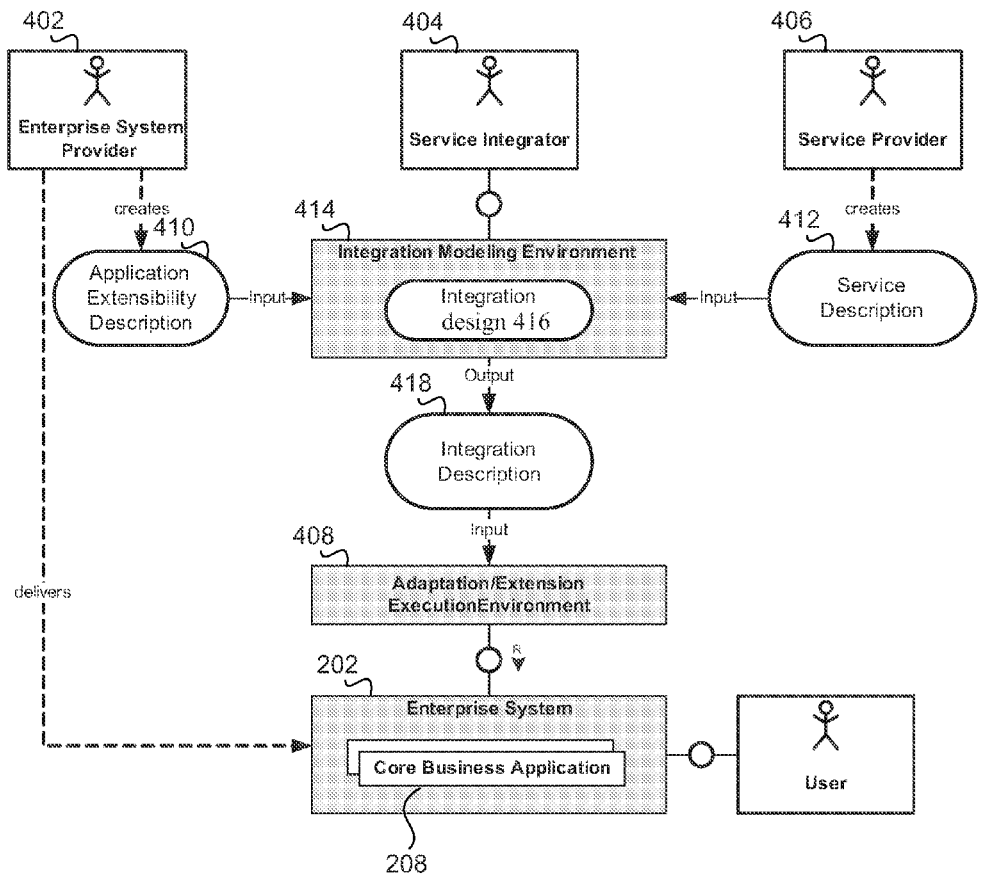
FIG. 4 depicts an overview of components of the service integration framework according to one embodiment.

FIG. 4 depicts an overview of components of service integration framework 200 according to one embodiment. Framework 200 includes an integration modeling environment 414, an adaptation/extension execution environment 408, and enterprise system 202.

An enterprise system provider 402 creates and delivers enterprise system 202 to run different core business applications 208. Business applications 208 are used by a service consumer (e.g., a user). Enterprise system 202 is connected to an adaptation/enactment execution environment 408 to allow for adaptations and extension of enterprise system 202 after initial shipment at a later stage in the software-lifecycle. Although the adaptation and extension may be performed after shipment, the adaptation and extension may be perform at any time.

An application extensibility description 410 represents a model of extensibility capabilities for core business application 208 within enterprise system 202. In one embodiment, and application extensibility description 410 is maintained by enterprise system provider 402. Application extensibility description 410 contains possible extension points where the business application 208 can be extended or adapted. For example, application extensibility description 410 describes extension points on multiple application layers (e.g., presentation layer 302, business process layer 304, service layer 306, and business configuration layer 308). The extension points may be predefined points in business application 208 that may be candidates for extension. The extension points model the offered extensibility features of business application 208 on top of enterprise system 202. For example, extension points denote places in business application 208 that can be used to add a process step to a core process. Alternatively, extension points for the user interface allow the addition of a new UI element. Other extension points may be appreciated, such as extension points for the examples illustrated in Table I. An implementation of enterprise system 202 can be conformant with respect to the modeled extensibility features that are part of application extensibility description 410.

A service provider 406 creates a service description 412 for a service that is offered for consumption. Consumption may be when the service consumer desires to add the service to business application 208 as an extension. Service description 412 describes the service's capabilities with respect to multiple aspects. Among other information, the service description contains information that is relevant for an integration of the service into core business applications 208 (such as service operations with input and output interfaces, supported data types, messaging choreographies, offered default UI descriptions).

Service description 412 may be a model that is a representation of a "service" comprising of different aspects that describe the characteristics of the service. It may be based on existing service models described elsewhere (e.g., (Unified Service Description Language) USDL or Standard Markup Language (SML)) and extended/adapted for the purpose of describing integration details of the service. An implementation of a service can be conformant with respect to a service model in the modeled aspects of the service.

Service integrator 404 uses an integration modeling environment 414 to model aspects to define an integration of a selected service 204 into core business application 208 within enterprise system 202. Service integrator 404 may be a user or automated program. Data for a corresponding application extensibility description 410 and service description 412 are loaded into the integration modeling environment 414. Information about the integration may be internally stored into an integration design 416 data structure within modeling environment 414.

Integration design 416 describes the integration solution for the combination of (i) a business application (described in application extensibility description 410) and (ii) a service that needs to be integrated (described in service description 412). Integration design 416 includes a set of connections between elements of application extensibility description 410 and elements of service description 412. These connections may be established by service integrator 404 manually or automatically within integration modeling environment 414. Integration design 416 specifies steps to achieve a desired integration and it can additionally reference any combinations of software artifacts needed for the adaptation/extension execution environment 408 to perform the described service integration.

After all details have been specified, integration modeling environment 414 creates an integration description 418 that is used to parameterize the adaptation/extension execution environment 408. Integration description 418 can then be used to automatically extend business application 208 with a service. For example, integration design 416 includes instantiation and parameterization of one ore more atomic or complex adaptation patterns as will be described in more detail below.

Adaptation Patterns with Parameterization

Particular embodiments provide a pattern-driven development approach to allow extension of business application 208. In order to increase the abstraction level for unforeseen service integration development, the pattern-driven development approach allows service integrator 404 to model the integration solution using a set of predefined adaptation patterns rather then changing enterprise system 202 by manually adding code. Adaptation patterns help in realizing controlled extensibility and help in explicitly modeling and defining best-practice integration knowledge. An integration solution for extension of core business application 208 with service 204 can be modeled by the instantiation and parameterization of one or more adaptation patterns.

An adaptation pattern links elements of the application extensibility description 410 (describing the extensible parts of a core business application) with elements of service description 412 (describing the service that needs to be integrated). Each adaptation pattern describes a relationship between one or more extension points of the first application extensibility description 410 and one or more elements of the service description 412.

Adaptation patterns may be atomic or complex. Other patterns may also be appreciated. Atomic adaptation patterns may link one or more extension points in the application extensibility model to one or more elements in the service model. For example, atomic adaptation points define fine-granular adaptation/extension tasks service integrator 404 has to perform on the relevant application layers when integrating an unforeseen service. In one example, a UI element has to be added to a core UI component (presentation layer 302), an additional process step has to be added to a core process model (business process layer 304) or a business object has to be extended with an additional field for persisting data retrieved from the integrated service (service layer 306). Adaptation patterns are defined in a uniform way, independent of the application layer in which they can be applied (e.g., in a cross-layer service integration approach).

Figure 5:
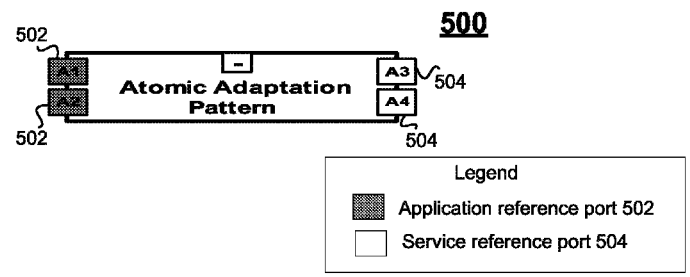
FIG. 5 depicts an example of a visual representation of an atomic adaptation pattern according to one embodiment.

FIG. 5 depicts an example of a visual representation of an atomic adaptation pattern 500 according to one embodiment. Different categories of ports may be provided, such as an application reference port 502 and a service port 504. Application reference port 502 parameterizes the adaptation pattern with links to elements (e.g., extension points) of application extensibility description 410 (e.g., ports A1 and A2) and service reference port 504 parameterizes the adaptation pattern with links to elements of service description 412 (e.g., ports A3 and A4).

Application reference ports 502 and service ports 504 may have an associated port type that defines the type of elements that can be connected to it (e.g., extension point types for application reference ports and service elements types for service reference ports). Beside the above port parameterization, a pattern can have additional parameters.

Different atomic adaptation patterns can be defined to model integration steps. For example, Table 2 some examples of atomic adaptation patterns. Other patterns may be appreciated and this list provides only a subset of possible atomic adaptation patterns:

TABLE 2

Examples of Atomic Adaptation Pattern

| Atomic Adaptation Pattern | Short Description |
|---|---|
| Presentation Layer Adaptation Patterns | |
| addButton | Adds a new button to an existing UI component |
| addMenuItem | Adds a new menu item to an existing menu |
| addTableColumn | Adds a new table column to an existing table |
| addTable | Adds a new table to an existing UI component |

TABLE 2-continued

Examples of Atomic Adaptation Pattern

| Atomic Adaptation Pattern | Short Description |
| --- | --- |
| addInputField | Adds a new input field to an existing UI component |
| addOutputField | Adds a new output an existing UI component |
| . . . | |

Process Layer Adaptation Patterns

| | |
| --- | --- |
| addAutomatedActivity | Inserts an new automated activity into a core process model |
| addHumanActivity | Inserts a new human activity into a core process model |
| addDataFlowElement | Inserts a new data flow element into a core process model |
| addControlFlowElement | Inserts a new control flow element into a core process model |
| . . . | |

Service Layer Adaptation Patterns

| | |
| --- | --- |
| extendBusinessObject | Adds a new field to an existing business object |
| extendServiceInterface | Extends an existing service with an additional field or operation |
| callLocalService | Integration Logic of new service needs to access existing services |
| readCoreAppData | Integration Logic of new service needs to read local data (via service call) |
| writeCoreAppData | Integration Logic of new service needs to write local data (via service call) |
| . . . | |

Service Mediation Adaptation Patterns

| | |
| --- | --- |
| addDataMediator | Adds a new data mediator to bridge structural mismatches between two data interfaces |
| addProcessMediator | Adds a new process mediator to bridge behavior mismatches between a process of the core business application and the service to be integrated |
| . . . | |

Figure 6:
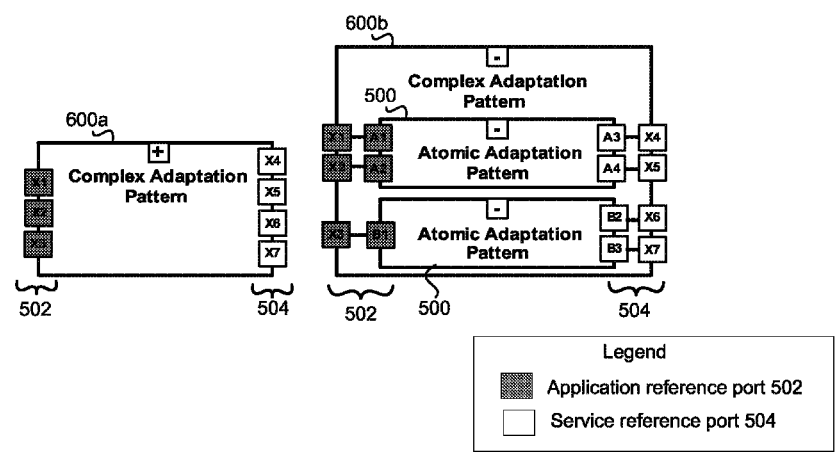
FIG. 6 depicts an example of a visual representation of a complex adaptation pattern according to one embodiment.

FIG. 6 depicts an example of a visual representation of a complex adaptation pattern 600 according to one embodiment. Complex adaptation patterns 600 may be composed of one or more atomic patterns 500 or other complex adaptation patterns. Complex adaptation patterns 600 define more coarse-grained adaptation/extension tasks that service integrator 404 has to perform on the relevant application layers when integrating an unforeseen service. Complex adaptation patterns 600 allow specifying service integration scenarios comprising of a set of fine-granular adaptation/extension tasks. For example, complex adaptation patterns 600 are used to group common patterns of model elements (and their relationships) into a pattern template for later re-use (e.g., share best-practices). Furthermore complex adaptation patterns 600 might be used by the modeling environment (e.g., by a recommender engine—discussed below) to search for possible docking points within the application extensibility description 410 where it might be possible to integrate a selected service.

Complex adaptation pattern 600 may use the same port categories as atomic adaptation pattern 500: an application reference port 502 parameterizes the adaptation pattern with links to elements of the application extensibility description 410 (e.g., X1, X2, X3) and a service reference port 504 parameterizes complex adaptation pattern 600 with links to elements of service description 412 (e.g., X4, X5, X6 and X7).

The visual representation of the complex adaptation pattern 600 can be collapsed (complex adaptation pattern 600*a*) and expanded (complex adaptation pattern 600*b*). Depending on the internal structure of the complex adaptation pattern, the ports of the complex adaptation patterns 600 may be linked or projected to the relevant ports of the atomic adaptation patterns (e.g., X1 to A1 or A3 to X4) as shown in complex adaptation pattern 600*a*. Also, ports 502 and 504 may be represented as a single port as shown in complex pattern 600*b*.

EXAMPLE

Adaptation Patterns and Parameterization

To illustrate the use of adaptation patterns, an example is described. The following example from the automotive sector illustrates the integration of tradable services into enterprise systems 202 in a service ecosystem scenario (Internet of Services). The service ecosystem comprises service providers, service consumers, and a service marketplace (also called service broker) accessed by service providers and consumers. The scenario is described from the perspective of a business application user (i.e., service consumer) who wants to integrate a new service to extend business application 208 with missing functionality and from the perspective of a provider of the service.

A manufacturer of car seats has to certify the manufacturer's products to guarantee that materials used within a car seat comply with ecological laws. Legal changes in export guidelines require this for ecological certification of products.

Figure 7A:
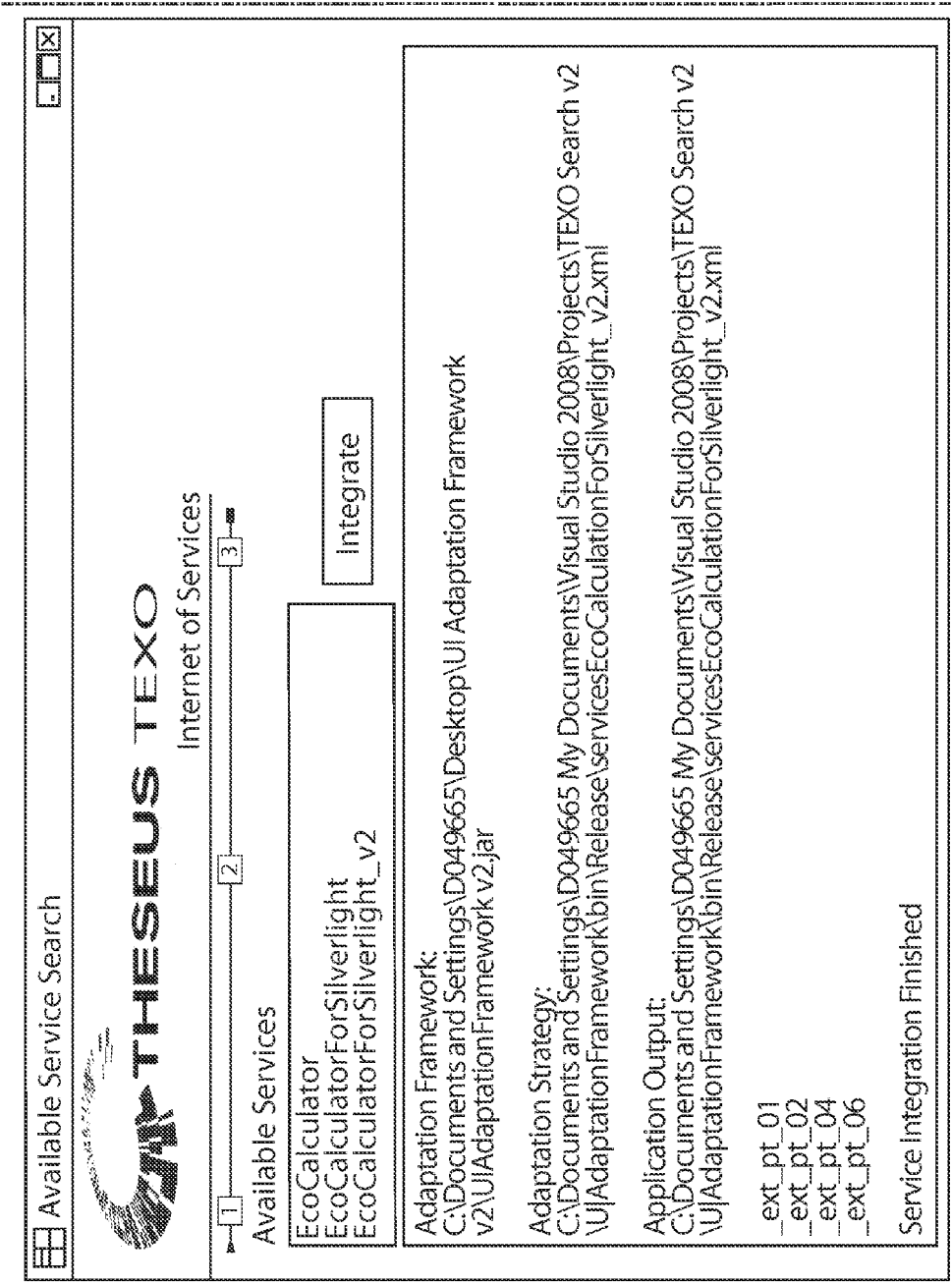
FIGS. 7A and 7B show an example of an interface of a business application according to one embodiment.
Figure 7B:
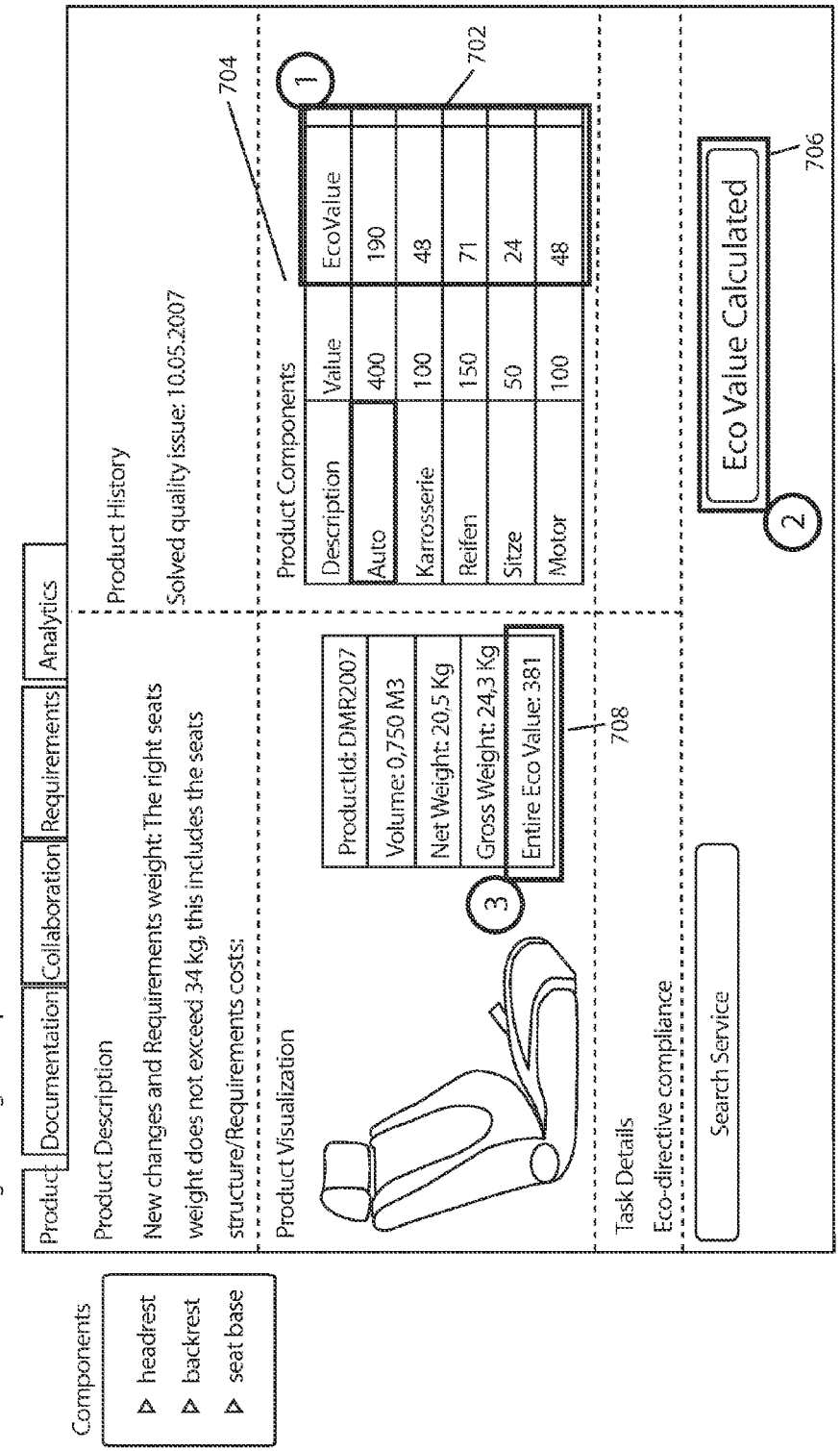

The manufacturer runs an enterprise system 202 including business application 208 for Product-Lifecycle-Management (PLM) that supports the company in the design process of car seats. FIGS. 7A and 7B show an example of an interface 700 of business application 208 according to one embodiment. The core version of business application 208 does not support the calculation of eco values for a given bill of material. Thus, business application 208 needs to be extended to support this calculation.

The missing functionality has been created and published as a service on the service marketplace by service provider 406. The service allows the calculation of eco values for products including certification. A product designer as a user of the PLM application in the company wants to extend business application 208 with this missing kind of functionality. The product designer takes the role of a service consumer and accesses the service marketplace directly from within business application 208. The product designer searches for services that provide the missing functionality and receives a list of matching services from various service providers certified for enterprise system 202. According to a working context, the designer selects a service called "Eco-Calculator" and purchases it on the marketplace.

Subsequently the service is automatically integrated into the core business application 208 without running a manual integration project. The following extensions are performed to the core business application 202 to extend interface 700 with (1) an additional table column 702 ("Eco Value") in a product components table 704, (2) an additional button 706 ("Calculate Eco Value") and (3) an additional field 708 indicating the total eco value for the car seat ("Entire Eco Value").

After the service is integrated into business application 202, the service can be used by the product designer to calculate eco values for a given bill of material. If the total eco value fulfils the legal requirements, a certificate is generated and passed to the consumer application.

The integration process for integrating the service in business application 208 will now be described in more detail. Service integrator 404 wants to integrate the Eco Calculator service into existing business application 202. It was not foreseen that business application 202 would work with this service when enterprise system 202 was shipped. In other words, business application 202 is not compatible with the Eco Calculator service. In order to integrate the service, service integrator 404 may receive different functional requirements from a business department, such as these four functional requirements: (1) The service should be integrated into the Product-Lifecycle-Management (PLM) part of enterprise system 202. (2) The service should be used before/after a product is shipped. (3) The eco values returned from the service should be displayed on an existing user interface within the standard table that displays the products that are part of the bill of material of the car seat. (4) The eco values returned from the Eco Calculator service should only be displayed on the user interface and not stored within enterprise system 202.

Figure 8A:
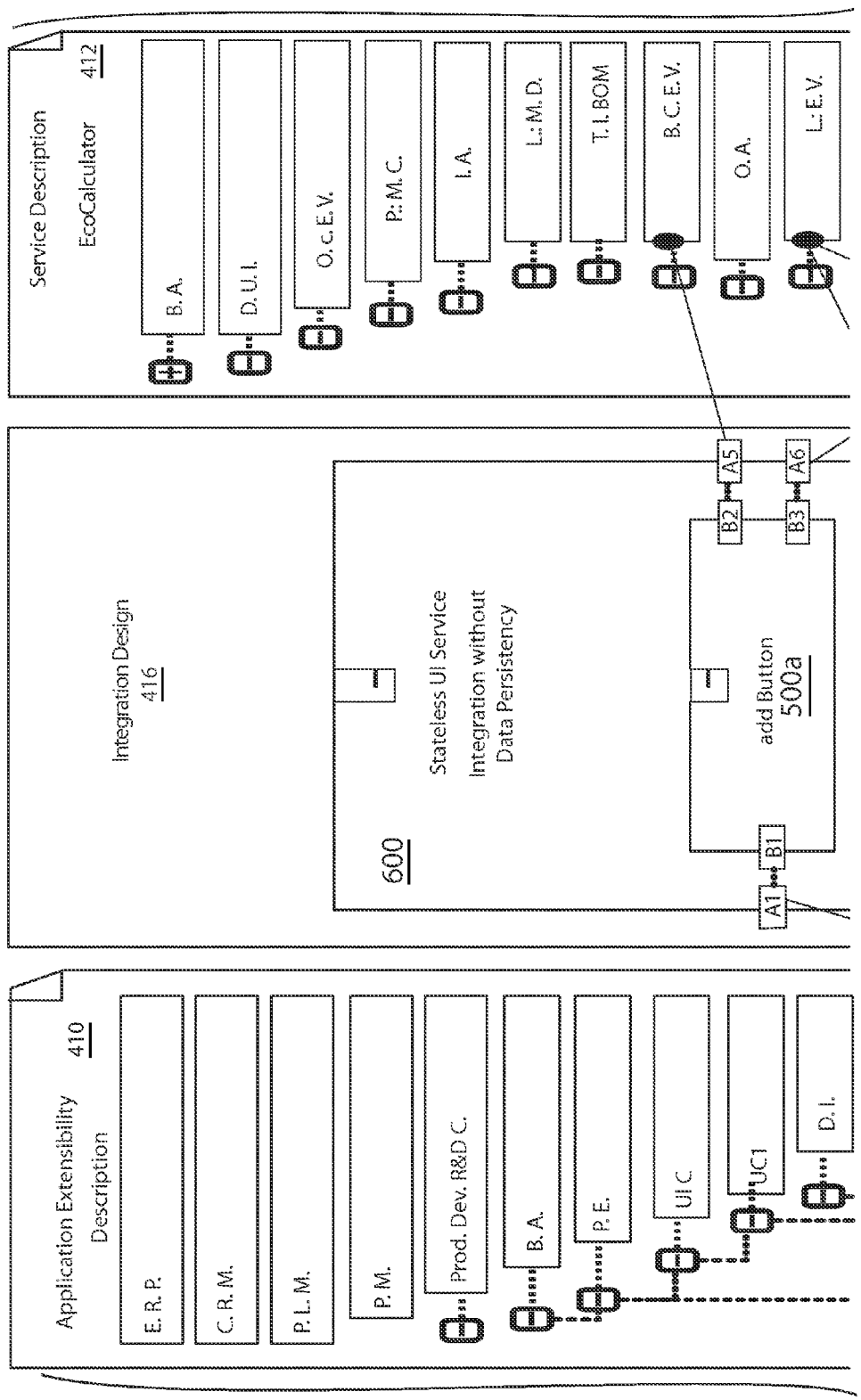
FIGS. 8A and 8B show an example of applying adaptation patterns to integrate a service according to one embodiment.
Figure 8B:
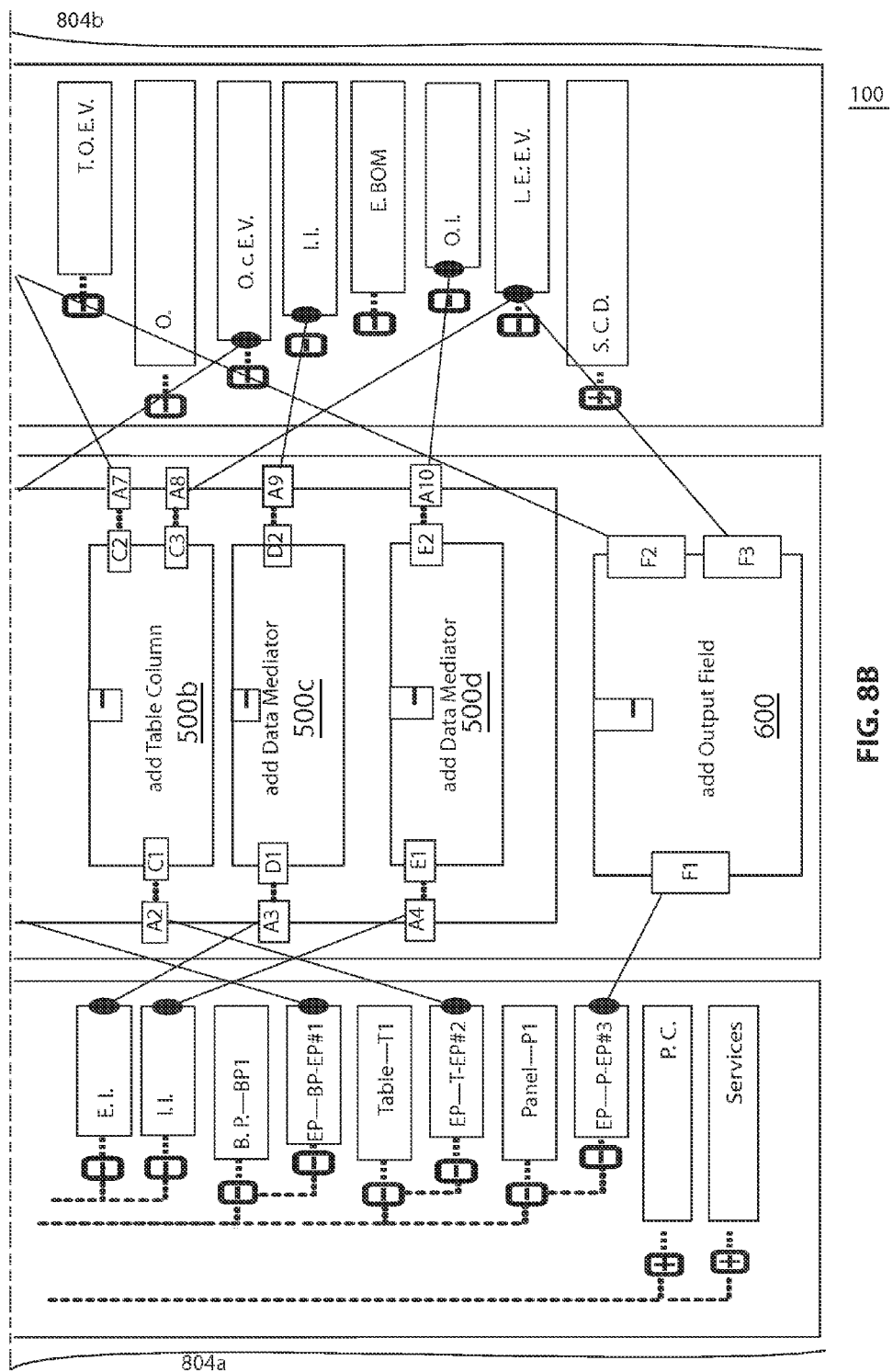

FIGS. 8A and 8B show an example of applying adaptation patterns to integrate a service according to one embodiment. Integration design 416 provides the adaptation patterns to extend application extensibility description 410 with a service from service description 412. Application extensibility description 410 includes extension points 804a and service description 412 includes elements 804b. Different granularities of extension points may be provided. For example, the extension point "UC 1" has been expanded to show additional extension points that are related to it.

The following extension points 804a in application extensibility description 410 are provided: Enterprise Resource Planning (E.R.P), Customer Relationship Management (C.R.M), Product Lifecycle Management (P.L.M), Product Management (P.M.), Product Dev. and R&D Collaboration (Prod. Dev. R&D C.), Business Applications (B.A.), Product Engineering (P.E.), UI Components (UI C), UC 1, Data Interface (D.I.), Export Interface (E.I.), Import Interface (LI.), Button Panel—BP1 (B.P.—BP1), EP-BP-EP#1, Table—T1, EP-T-EP#2, Panel-P1, EP-P-EP#3, Process Components (P.C.), Services. The following elements 804b in service description 412 are provided: Business Aspects (B.A.), Default User Interface (D.U.I.), Operation: calculateEcoValue (O.c.E.V.), Panel:Main Container (P.:M.C.), Input Area (I.A.), Label: Material Description (L:M.D.), TextInput: BOM (T.I.BOM), Button: Calculate Eco Value (B.C.E.V.), Output Area (O.A.), Label: Eco Value (L.:E.V.), Text Output: Eco Values (T.O.E.V.), Operations (O.), Operation:calculateEcoValue (O.c.E.V.), Input Interface (LI.), Element: BOM (E.BOM), Output Interface (O.I.), List Element: Eco Values (L.E.:E.V.), and Service Choreography Description (S.C.D.). Other extension points 804a and elements 804b will be appreciated.

Integration design 416 includes the parameterization of the adaptation patterns that are required to integrate the service into core business application 202. One pattern is a complex adaptation pattern 600 called stateless UI service integration without data persistency. Adaptation pattern 600 may be automatically determined as an adaptation pattern for this extension or may be manually determined For example, complex adaptation pattern 600 may be automatically recommended as will be described below. Also, based on the business requirements, service integrator 404 may browse a catalog of available adaptation patterns and may select the complex adaptation pattern "Stateless Service integration without data persistency". Each adaptation pattern may be thought of as a template that provides different business requirements. That is, each adaptation pattern may be used for different extensions. This template may be selected because it technically seems to (completely or partially) fit to the given business requirements on how the service should be integrated.

In this case, complex adaptation pattern 600 allows for the integration of a stateless service (e.g., having one operation) into an existing UI component. The service is triggered via an additional button on the core UI component and the results of the service invocation are displayed in an additional table column within the core UI component. The result data of the service operation is not persisted within enterprise system 202. As can bee seen in FIG. 8, complex adaptation pattern includes four atomic adaptation patterns 500a-500d comprising the single integration tasks to realize the outlined integration requirements: (i) addButton, (ii) addTableColumn, (iii) addDataMeditator and (iv) addDataMediator.

The following connections between application extensibility description 410, adaptation pattern 600, and service description 412 may be performed automatically or manually. Extension points 804a are connected to one side of atomic patterns 500 and elements 804b are connected to another side of adaptation patterns 500a. In one example, service integrator 404 browses in application extensibility description 410. A selection for the business application "Product Engineering" is received from the user for the UI component "UC1" to integrate the service. An input to instantiate the complex adaptation pattern 600 is then received. As connections are made, different values are stored to parameterize the ports. The parameters indicate how the adaptation patterns were connected on the user interface. The connecting continues until complex adaptation pattern 600 and its four application reference ports (A1, A2, A3, and A4) and six service reference ports (A5, A6, A7, A8, A9, and A10) are linked to the ports of the contained atomic adaptation patterns.

FIG. 9 shows a table describing the adaptation patterns that are used to extend business application 202 in more detail according to one embodiment. Complex adaptation pattern 600 includes the four atomic adaptation patterns, addButton, addTableColumn, addDataMediator, and addOutputField. The addButton atomic adaptation pattern is used to insert a new button on an existing panel using the application reference port B1 with the port type Extension Point Type—Button Panel. This port is parameterized with the value BP-EP#1. The text for the button is taken from the Default User Interface section of the service description (service reference port B2). The information for the event handler of this button (i.e., the service operation that is called when the button is pressed) is taken from the operations section of the service description (service reference port B3).

The addTableColumn atomic adaptation pattern is used to extend an existing table with an additional column using the application reference port C1 with the port type Extension Point Type—Table. This port is parameterized with the value EP—T-EP#2. The name for the new table column is taken from the Default User Interface section of the service description (service reference port C2). The information which data is shown in this additional table column is taken from Operations section of the service description (service reference port C3).

The addDataMediator atomic adaptation pattern is used to define the data mapping between the export data interface of the UI component (application reference port D1 with port type Data Interface) and the Input Interface of the service operation to be called (service reference port D2 with port type Input Interface).

The addDataMediator atomic adaptation pattern is used to define the data mapping between the Output Interface of the called service operation (service reference port E2 with port type Output Interface) and the import data interface of the UI component (application reference port E1 with port type Data Interface).

In addition to complex adaptation pattern 600, an atomic adaptation pattern 500 is provided. The addOutputField atomic adaptation pattern is used to extend an existing panel with an additional field using the application reference port F1 with the port type Extension Point Type—Panel. This port is parameterized with the value EP—P-EP#3. The name for the new field is taken from the default user interface section of the service description (service reference port F2). The information which data is shown in this field is taken from the Operations section of the service description (service reference port F3).

Other adaptation patterns may be instantiated to integrate the Eco calculator service.

As can be seen from the above example, atomic adaptation patterns can be combined into complex adaptation patterns. Based on the same principle, cross-layer adaptation patterns can be defined consisting of atomic adaptation patterns from different application layers (e.g., presentation layer 302 and business process layer 304 adaptation patterns).

As will be described below, the parameterization of adaptation patterns 600 and 500 are used to generate integration description 418, which is then used to extend business application 202.

Figure 10:
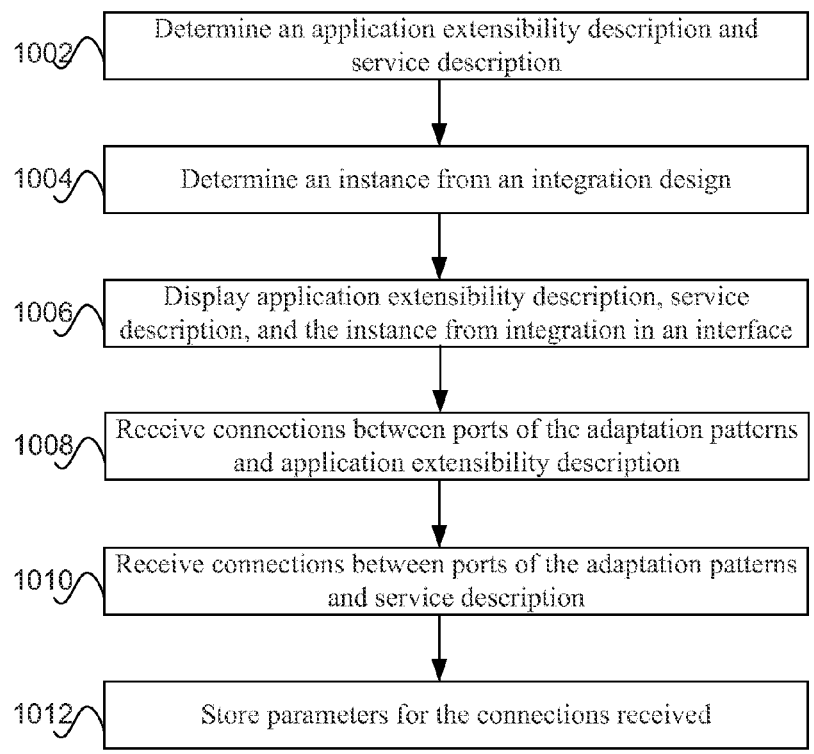
FIG. 10 shows a table describing the adaptation patterns that are used to extend the business application in more detail according to one embodiment

FIG. 10 depicts a simplified flowchart 1000 for parameterizing adaptation patterns according to one embodiment. At 1002, an application extensibility description 410 and service description 412 are determined For example, a specific application extensibility description 410 and a specific service description 412 are determined based on a desired integration of a service.

At 1004, an instance from integration design 416 is determined The instance includes adaptation patterns that may be used to integrate the service with business application 202.

At 1006, application extensibility description 410, service description 412, and the instance from integration design 416 are displayed in an interface. At 1008, connections between ports of the adaptation patterns and application extensibility description 410 are received. At 1010, connections between ports of the adaptation patterns and service description 412 are also received. The connections may be received from input of a user or may be determined automatically.

At 1012, parameters for the connections received are stored. These parameters are used to extend business application 202.

Models in the Service integration Framework

Figure 11:
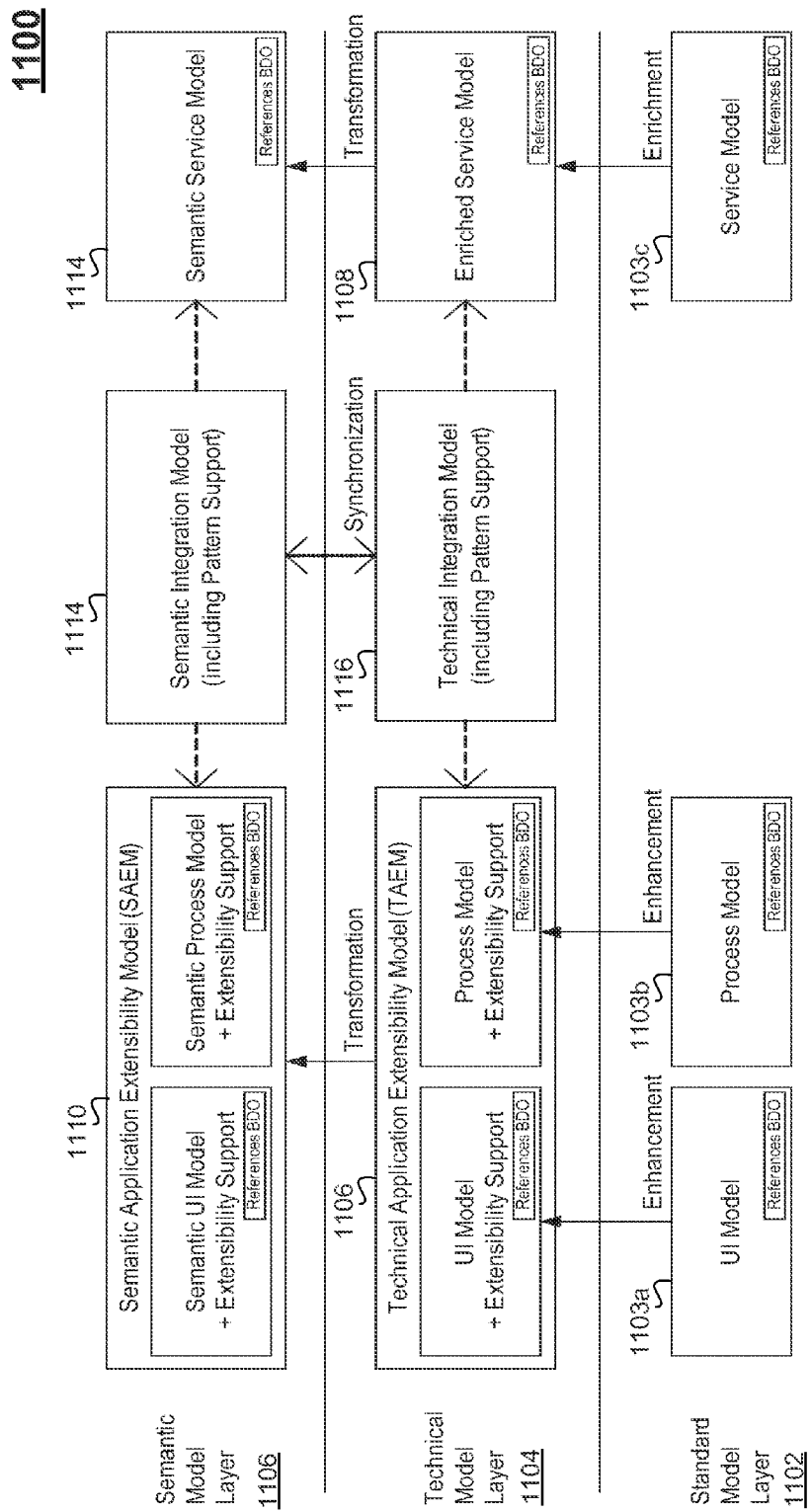
FIG. 11 shows the relationship of models on three different model layers used in service integration framework according to one embodiment.

Before describing the runtime environment, different models that are used in application extensibility description 410 and service description 412 will be described. The models may be characterized in different layers. FIG. 11 shows the relationship of models on three different model layers used in service integration framework 200 according to one embodiment. Other layers and models may also be appreciated.

A standard model layer 1102 contains the models to describe business application 202 and the service according to modeling languages that are well-known and/or standardized (e.g., Business Process Modeling Notation (BPMN), USDL). This layer contains UI Models 1103a, business process (BP) models 1103b as well as service models 1103c. All models in standard model layer 1102 are referred to as standard models.

A technical model layer 1104 contains models to describe business application 202 or services with respect to their extensibility support. Standard models from standard model layer 1102 may not suffice for this purpose because they lack necessary modeling elements (for example, to model extension points). Therefore, the standard models are enhanced with extensibility concepts to model several kinds of extension points (and e.g., connection elements). All models on technical model layer 1104 are referred to as technical models.

A Technical Application Extensibility Model (TAEM) 1106 represents a description of extensible business application 208 and it comprises all kinds of models to describe the extensibility support of business application 208 on different application layers (e.g., enhanced UI model, enhanced BP model, as well as other models). To describe these models, the modeling languages from standard model layer 1102 are enhanced (e.g., enhancements for Business Process Modeling Notation (BPMN) models, enhancements for UI models). For example, a process model with extensibility support from technical model layer 1104 may contain all modeling elements from the process model (e.g., standard model layer 1102) and additional new extension point modeling elements as well as new connection elements to connect BPMN model elements to them.

An enriched service model 1108 is an enriched model that contains modeling elements from the service model from standard model layer 1102 plus additional modeling elements introduced on technical model layer 1104.

Technical model layer 1104 also includes a technical integration model 1110. It represents aspects of the integration design and contains details on how elements from TAEM 1108 are connected to elements from enriched service model 1108.

A semantic model layer 1106 includes ontology representations of the models from the technical integration layer 1104. For this purpose, technical models are transformed into ontological representations residing on semantic model layer 1106. All models on semantic model layer 1106 are referred to as semantical models.

A semantic application extensibility model (SAEM) 1110 includes ontologies that denote the technical models from technical model layer 1104, for example, a semantic UI model (with extensibility support) or a semantic BP model (with extensibility support), or other models of similar kind.

A semantic service model 1112 represents an ontology for enriched service model 1108 from technical model layer 1104. A semantic integration model 1114 represents an ontology for a technical integration model 1116 from technical model layer 1104.

Some of the models on all three layers can contain references to other ontologies, for example, business domain ontologies (BDO) to model important concepts in a business domain, or similar kinds of ontologies.

Standard models (e.g., UI model, BP model, service model) can contain references to ontologies, such as Semantic Annotations Web Services Description Language (SAWSDL) standards. Likewise all models on technical model layer 1104 and all models on the semantic model layer 1106 can contain such references. Technical integration model 1116 and semantic integration model 1114 may contain references to such ontologies.

Figure 12:
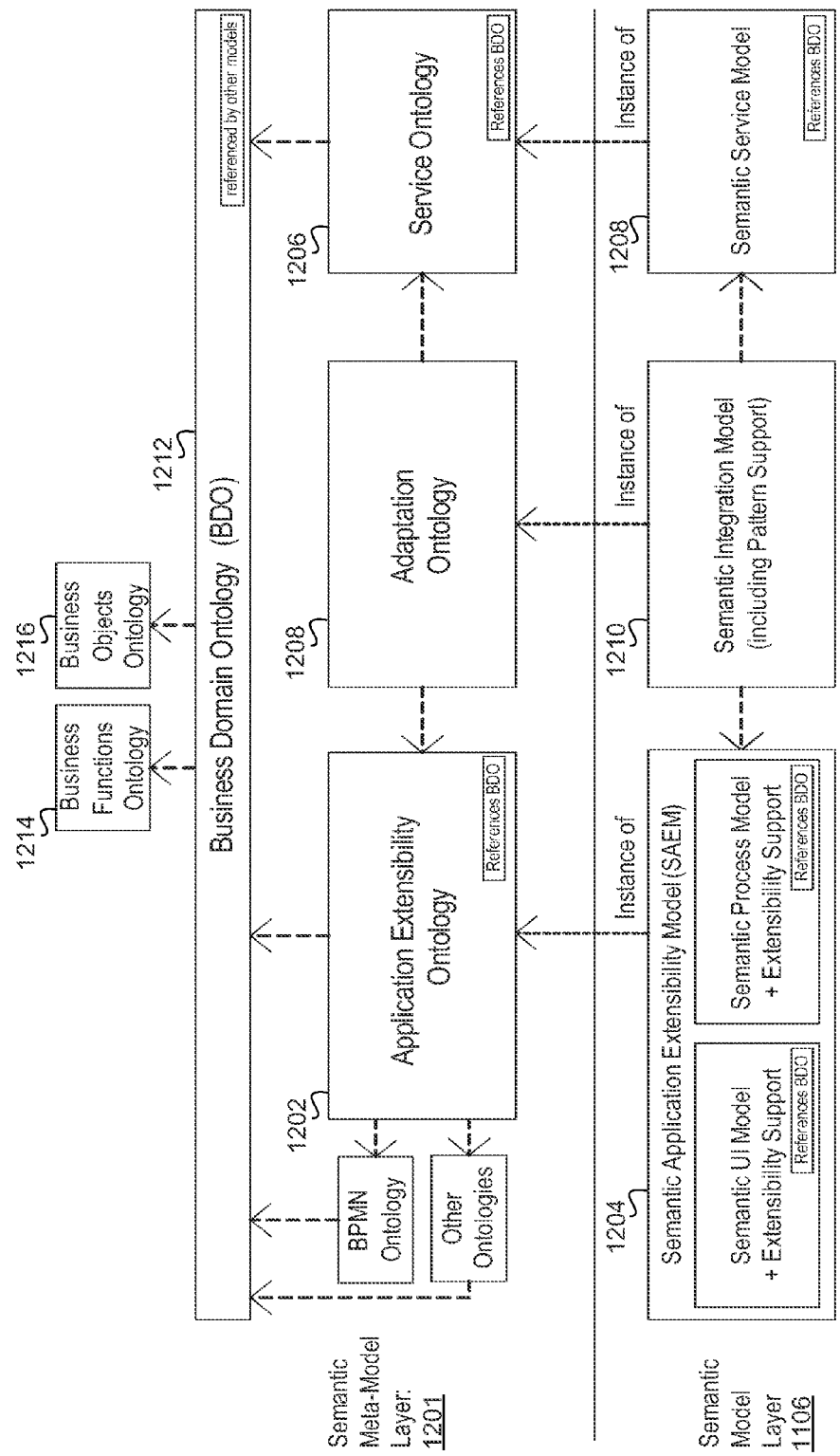
FIG. 12 shows a top-level semantic meta model layer according to one embodiment.

Semantic model layer 1106 will now be described in more detail. FIG. 12 shows a top-level semantic meta model layer 1200 according to one embodiment. Top-level semantic meta model layer 1200 includes ontologies that represent and introduce the concepts and relationships that are used on semantic model layer 1106. All models (ontologies) on semantic meta model layer 1201 are referred to as semantic meta models.

Each semantic model (ontology) from semantic model layer 1106 corresponds to a semantic meta model (ontology) on the semantic meta model layer 1201.

An application extensibility ontology 1202 contains concepts and relations to model semantic application extensibility models 1204 on semantic model layer 1106. For example, concepts for extension points are defined here. Other ontologies (e.g., BPMN Ontology, UI Ontology) are imported here.

A service ontology 1206 contains concepts and relations to model semantic service models 1208 on semantic model layer 1106.

An adaptation ontology 1208 contains concepts and relations to model semantic integration models 1210 on semantic model layer 1106 (e.g., concepts and relations to model adaptation patterns). It imports application extensibility ontology 1202 and service ontology 1206.

A business domain ontology 1212, such as existing enterprise ontologies, defines business semantics used in the (functional) classification of enterprise system 202 (e.g., terminology used to describe business functions, core processes or business objects and their states). Business domain ontology 1212 contains with business functions ontology 1214 and business objects ontology 1216. Semantic meta models can refer to business domain ontology 1212. By annotating elements of (1) application extensibility ontology 1202 and (2) elements of service ontology 1206 with elements of business domain ontology 1212 (semantic lifting), it is possible to perform context-based matching, e.g., to find suitable elements of application extensibility ontology 1202 (e.g., extension points) that semantically match for a given adaptation pattern instance that has already been partially linked with elements of service description 412. The semantic information might be used by the recommendation engine of the service integration framework that provides guidance for linking adaptation patterns, the concept of which will be described below in more detail.

The concepts and elements of possible ontologies will now be described in more detail.

Meta Model of Service Integration Framework

Following a model-based approach, particular embodiments are based on a common conceptual basis formalized in a meta model. FIGS. 13A, 13A2, 13A3, and 13A4 describe relevant meta model entities and their relationships according to one embodiment. In one embodiment, the overall meta model of service integration framework 200 is partitioned into four ontologies (in FIG. 13a only a subset of relevant meta model entities and their relationships are exemplary shown):

Application extensibility ontology 1202
Service ontology 1206
Adaptation ontology 1208
Business domain ontology 1212

For the ontologies, contained modeling elements inherit from corresponding root model entities: app_component (Application extensibility ontology 1202), service_component (Service ontology 1206), root_object (Top-Level Adaptation ontology 1208), integration_component (Core Adaptation ontology 1302) and bd_object (Business domain ontology 1212).

Application extensibility ontology 1202 contains entities and relationships to describe a business application with the focus on its extensible/adaptable parts. According to the application layers of a business application, three main modeling entities are defined as subclasses of the app_component entity: ui_component, process_component and service_component. Each of these entities represents a public model of core business application 208 and can further be refined by application layer specific sub-concepts (e.g., ui_table representing a table model on the presentation layer or bp_task representing a process step in a core process model). Each app_component entity can be linked with an extension point entity (more specific with application layer specific subclasses of it). Via these entities, dedicated extension/adaptation possibilities of core business application elements can be modeled. For example an ui_table entity is linked with an ui_ep_table or a process_component entity is linked with an bp_extensionpoint entity.

Service ontology 1206 contains entities and relationships to describe the different facets of a service model, e.g., business-, operational- and technical aspects. For example the entity s_operation defines a service operation with its signature, modeled with the entities s_inputinterface and s_outputinterface, which both can have multiple formal parameters modeled via entity s_parameter. Subclasses of the entity sui_object define elements required for the definition of a default user interface for a service operation. A sui_operation entity refers to a sui_textinput entity (defining a text input element to enter input data for the invocation of the operation), a sui_label entity (defining a UI label for the text input element), a sui_button (defining a button text to trigger the operation), a sui_textoutput (defining a text output element to display the result of the invocation of the operation) entity as well as to a sui_panel entity (defining the panel of the default user interface for the service).

Business domain ontology 1212 contains entities and relationships to explicitly describe business semantics used in the (functional) classification of enterprise system 202. The functional description of enterprise system 202 may be expressed with the entity bd_function and its subclasses bd_solution, bd_process_category, bd_main_process and bd_process_varaiant, all of which allow defining the functional characteristics on different levels of granularity. Beside the functional dimension of enterprise system 202, the entity bd_businessobject allows the definition of business object which might be referenced by bd_function entities (and vice versa).

Figure 13A:
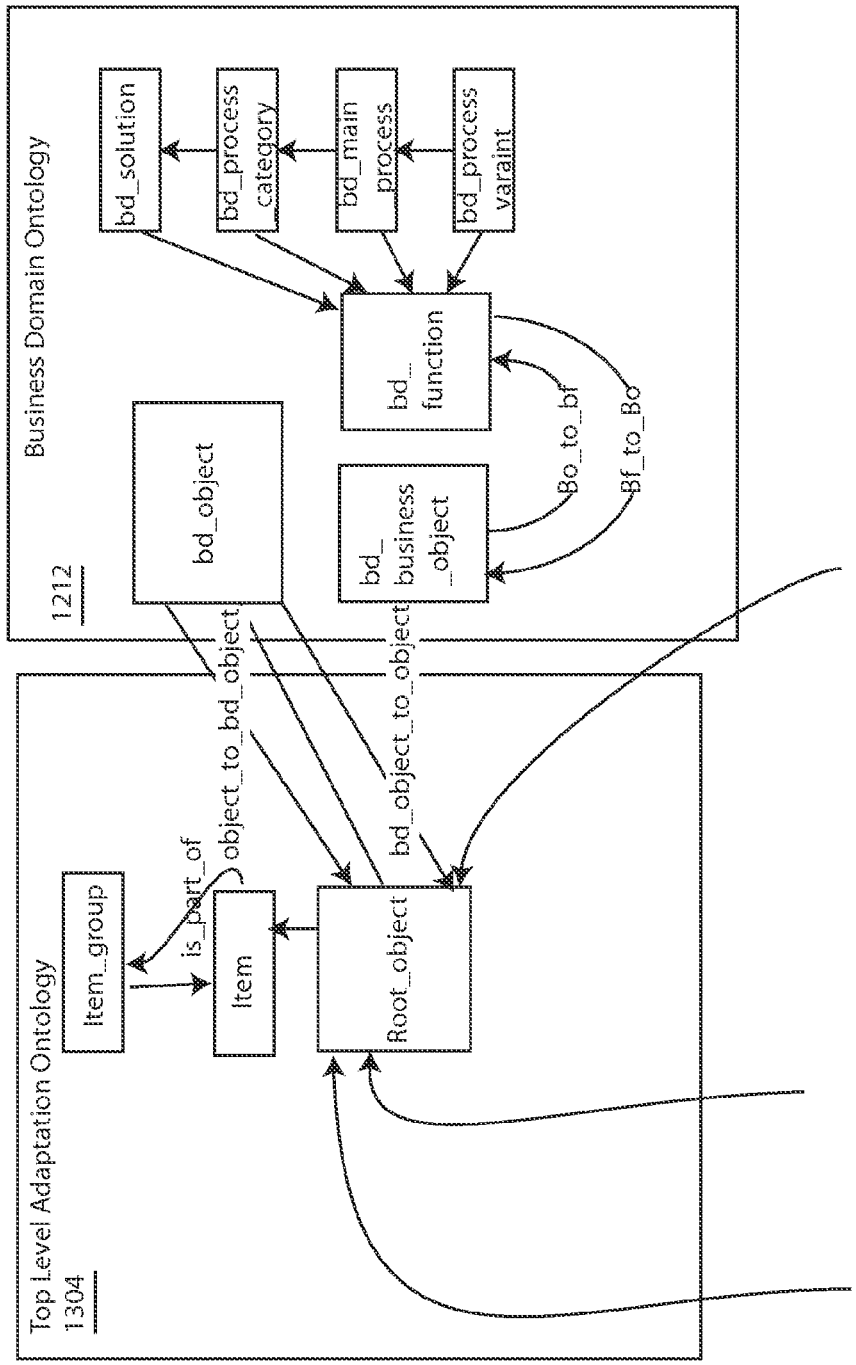

Adaptation ontology 1208 contains entities and relationships to link entities of the Application extensibility ontology 1202 (describing core business applications 208 including its extensible/adaptable parts) and service ontology 1206 (describing the service that should be integrated into core business application 208). As can be seen in FIG. 13a, adaptation ontology 1208 itself is divided into two parts: a core adaptation ontology 1302 and a top-level adaptation ontology 1304. Core adaptation ontology 1302 contains entities and relationships that allow the modeling of the adaptation pattern concept. An adaptation pattern template is defined via the entity pattern_class that can refer to other adaptation patterns using the entity pattern_reference (e.g., used for the definition of complex adaptation patterns).

Application reference and service reference port templates are defined using the entities application_reference_port_class and service_reference_port_class. Instances of adaptation patterns are modeled via the entity pattern_instance, accordingly the entity port_instance is used to reflect port instances. Finally a pattern_instance entity can be linked with a port_instance entity and vice versa.

Top-level adaptation ontology 1304 provides with the object entity a top-level meta model entity where all other root model entities are derived from: app_component (application extensibility ontology 1202), service_component (service ontology 1206), root_object (top-level adaptation ontology 1208), integration_component (core adaptation ontology 1302) and bd_object (business domain ontology 1212).

In general, all object entities (including its concrete subclasses) can refer to bd_object entities of business domain ontology 1212. The linkage between entities of core adaptation ontology 1302 and application extensibility ontology 1202 is realized via the association between the integration_component entity and the app_component entity. The linkage between entities of core adaptation ontology 1302 and service ontology 1206 is realized via the association between the integration_component entity and the service_component entity.

Figure 13B:
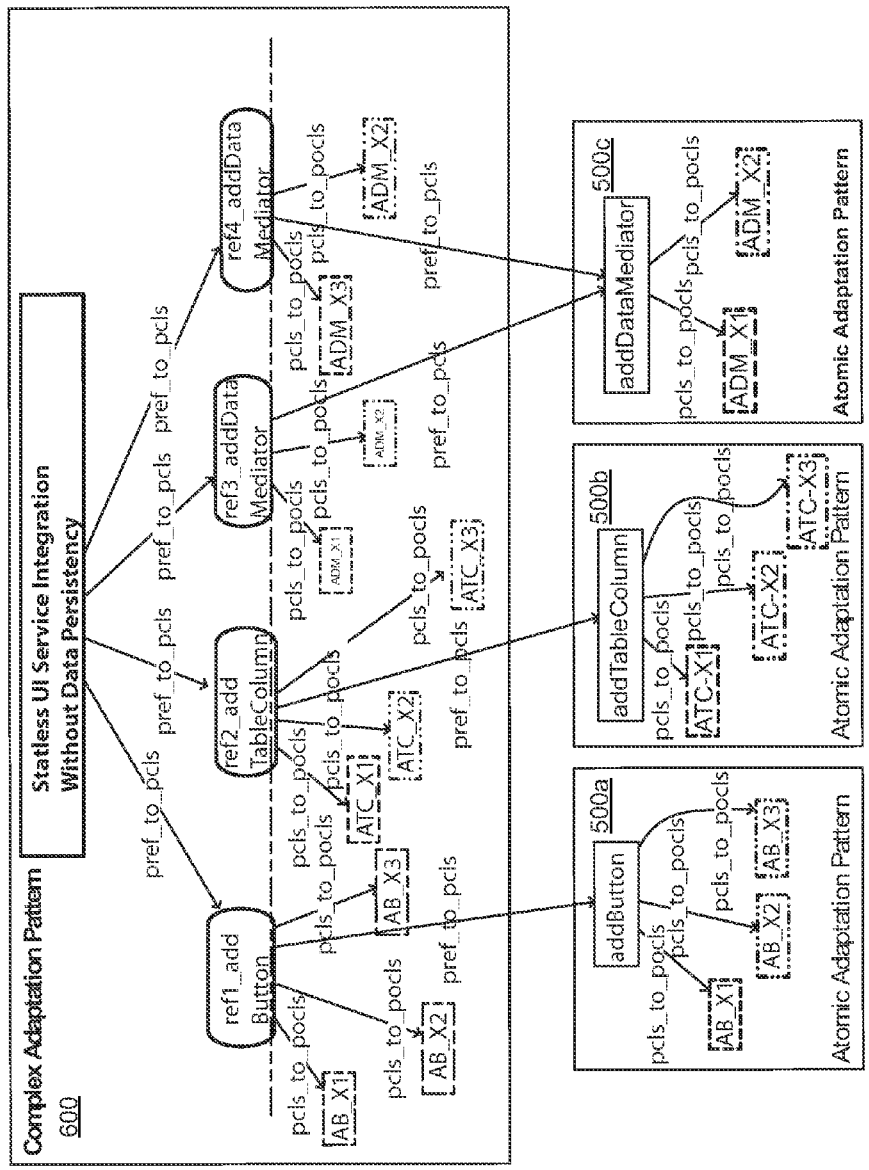
FIG. 13B shows an example adaptation ontology for the modeling of a complex adaptation pattern according to one embodiment.

Based on the introduced meta model including four ontologies, FIG. 13B shows an example adaptation ontology for the modeling of a complex adaptation pattern according to one embodiment. As an example, the complex and atomic adaptation patterns that have been introduced above are shown. For example, a complex adaptation pattern 600 "Stateless UI Service integration without Data Persistency" is modeled via the entity pattern_class. It references four atomic adaptation patterns 500*a*-500*c*, modeled via the relationship pref_to_pcls and the pattern_reference entity (ref1_addButton, ref2_addTableColumn, ref3_addDataMediator and ref4_addDataMediator). Each pattern_reference entity itself references an application_reference_port_class and one or more service_reference_port class entities via the relationship pcls_to_pocls. In addition, each pattern_reference entity references a pattern_class entity via the relationship pref_to_pcls. The atomic adaptation pattern definitions (addButton, addTableColumn, addDataMediator) are defined using the same meta modeling principles.

Figure 14:
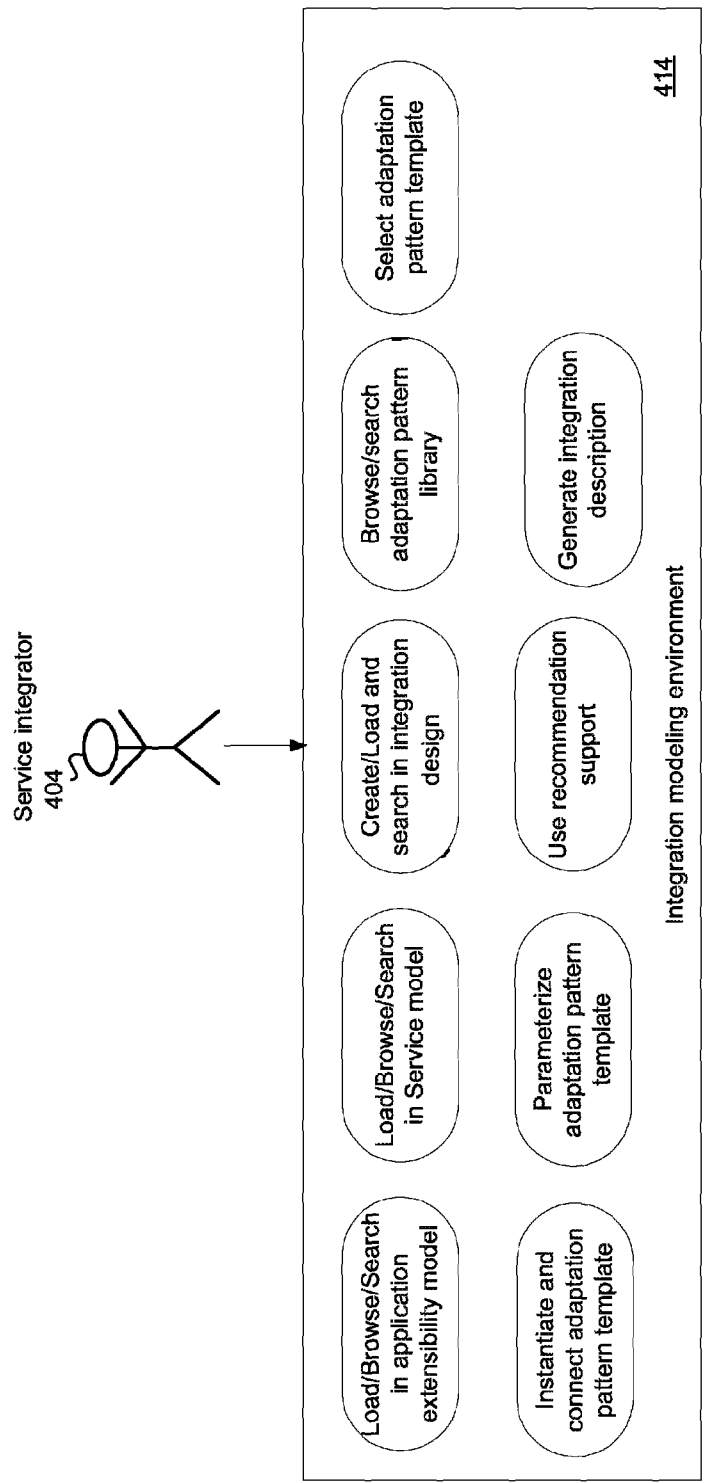
FIG. 14 shows the usage scenarios that are supported by an integration modeling environment that is used by a service integrator according to one embodiment.

The following describes the design of the integration of a service into business application 208. FIG. 14 shows the usage scenarios that are supported by integration modeling environment 414 that is used by service integrator 404 according to one embodiment.

Service integrator 404 can load the contents of application extensibility description 410 and service description 412 into integration modeling environment 414. Application extensibility description 410 and service description 412 may be models that are loaded into the modeling tool. The model may be a portion of the whole application extensibility description 410 or service description 412. Service integrator 404 can inspect displayed (graphical or textual) representations of application extensibility description 410 and service description 412 to browse the contents of these semantic models. In addition, it is possible to search within these models.

Integration modeling environment 414 may receive new instances of integration designs that are created by service integrator 404. Alternatively, integration modeling environment 414 may load an existing integration design into a modeling tool (e.g., after a tool restart). Enhancement of the integration model (instances) may be performed as follows:
- the adaptation pattern library may be browsed and a selection of some of the available adaptation patterns for further use may be received,
- new instances of selected adaptation patterns may be created and ports of the adaptation pattern instances may be connected with elements in application extensibility description 410 or the service description 412,
- adaptation pattern instances may be parameterized (e.g., by providing missing information that are needed to completely define how the pattern is applied in the surrounding context),
- recommendation support functionality is provided (decision making support system) to identify possible appliances of adaptation patterns, possible connections between either pattern ports, application extensibility model elements or service model elements, or to identify sets of possible parameterization options for instantiated adaptation patterns.

Integration modeling environment 414 may be used to create integration models 416 and define adaptation pattern templates. For example, integration modeling environment 414 may be used to load and parse an application extensibility description 410 and display one or more extension points in application extensibility description 410 to allow for selection by the user. It is possible to browse and search in application extensibility description 410. Application extensibility description 410 may exist previously.

Integration modeling environment 414 may load and parse a service description 412 and can display the different elements (aspects) of service description 412 to allow for selection by the user. It is possible to browse and search in service description 412. Service description 412 may exist previously.

Integration modeling environment 414 may create a new instance of integration design 416 or load or modify an existing integration design 416. Integration modeling environment 414 can present integration design 416 to a user (e.g., using a visual modeling syntax) and allow a user to modify integration design 416 (e.g., its constituent link descriptions). It is possible to search in integration design 416. Basically the creation of integration design 416 is done by the instantiation and parameterization of adaptation patterns.

Integration modeling environment 414 may allow adding, removing, modifying, and parameterizing instances of adaptation patterns within integration design 416. For example, integration modeling environment 414 allows connecting ports of an adaptation pattern instance with elements in application extensibility description 410 or integration design 416. This may be done automatically or manually.

Integration modeling environment 414 allows creating and modifying atomic and complex adaptation pattern templates that can contain references to other existing (parameterizable) adaptation pattern templates. The complex templates can carry their own description attributes additionally. Integration modeling environment 414 can store (atomic and) complex adaptation pattern templates to disk, repository or other similar storage. It is possible to browse the adaptation pattern library and select some of the available adaptation patterns for further usage. Complex adaptation patterns 600 might be composed of atomic adaptation patterns 500. Integration modeling environment 414 allows searching and browsing for technical elements within application extensibility-, service- or integration descriptions (e.g., extension points or service elements) that may optionally have been explicitly annotated with business semantics provided by a business domain ontology 1212.

Integration modeling environment 414 allows use of a recommendation support functionality (decision making support system) to identify and suggest possible connections between pattern ports, application extensibility description elements or service description elements, or to identify sets of possible parameterization options for instantiated adaptation patterns. The underlying recommender engine provides recommendations for possible next integration actions or possible integration opportunities based on the current context of integration design 416. The recommendation engine uses queries and reasoning techniques over the application extensibility description, service description, and integration descriptions. The results are displayed in the modeling tool to the user.

In addition, integration modeling environment 414 may guide a user through an integration process based on an integration guidance algorithm. Integration modeling environment 414 allows creating and storing of parts of integration designs 416 within an integration description 418 (e.g., a file) and stores it within a dedicated integration description storage. Integration description file 418 contains information/artifacts that the runtime part if service integration framework 200 needs to adapt core business application(s) 208 in such a way that the service is integrated and ready for usage.

Example of User Interface of Integration Modeling Environment 402

Figure 15A:
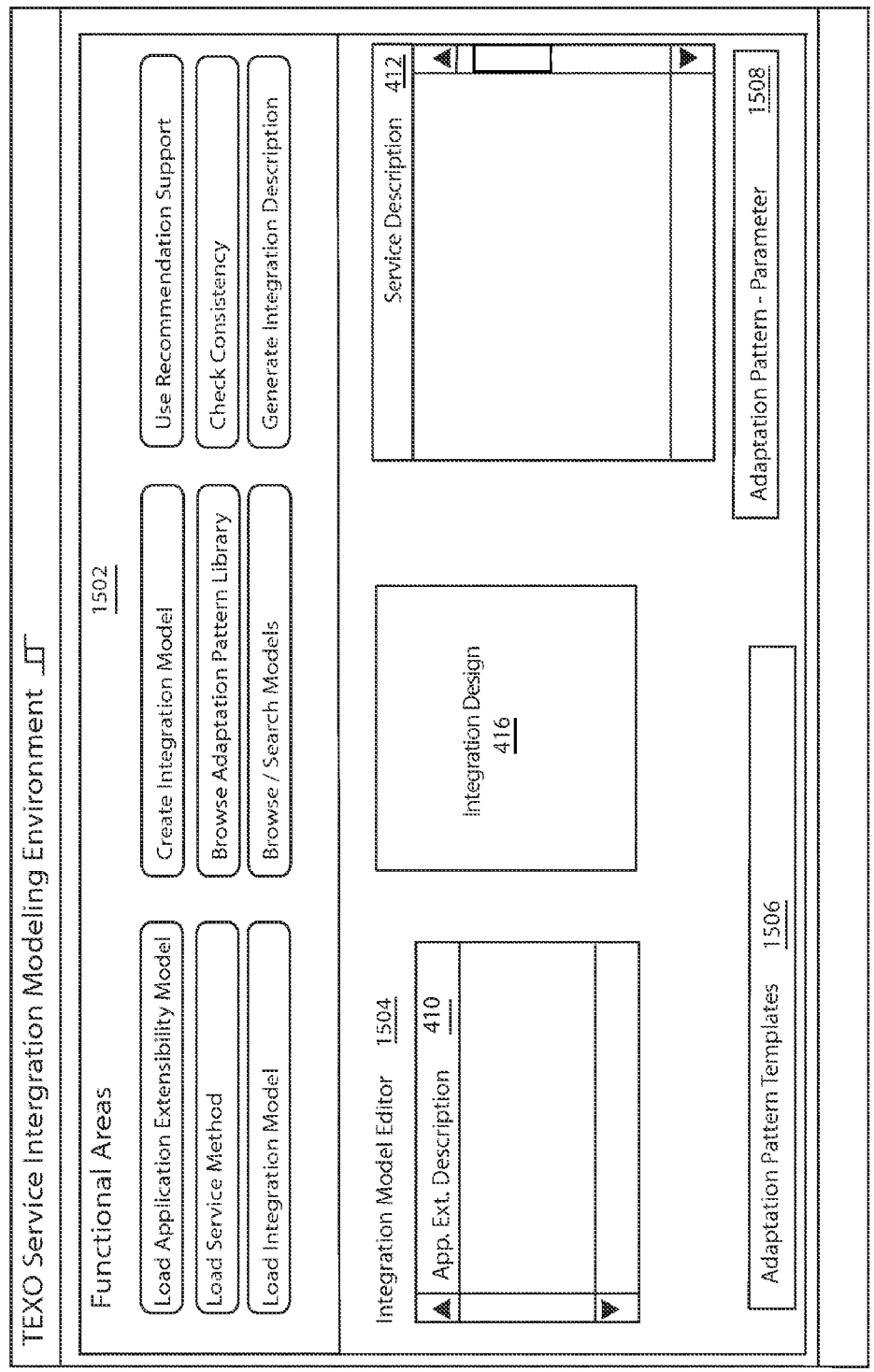
FIGS. 15A and 15B show an example of a user interface of the integration modeling environment according to one embodiment.
Figure 15B:
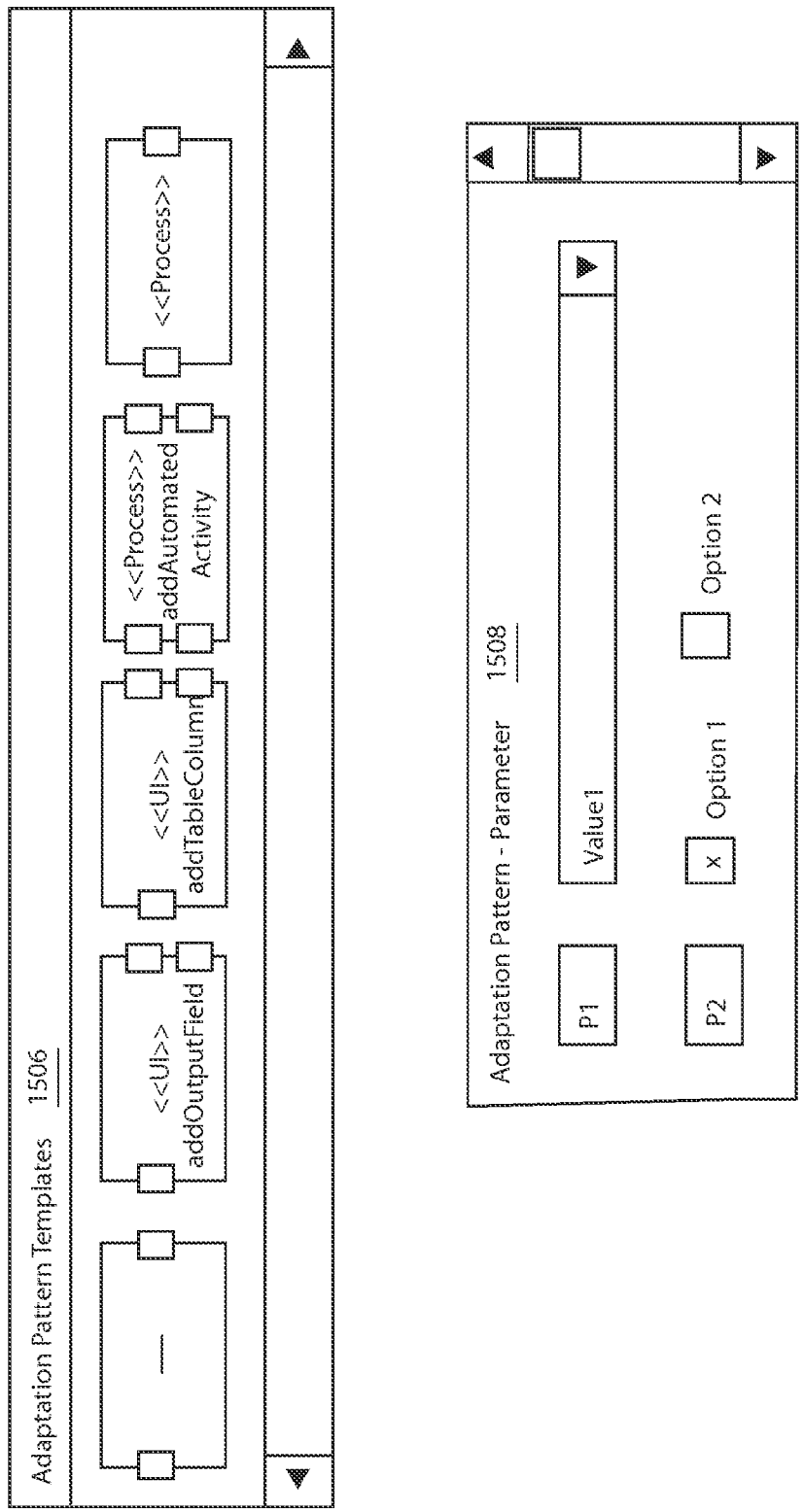

FIGS. 15A and 15B show an example of a user interface 1500 of integration modeling environment 402 according to one embodiment. User interface 1500 may be divided into two main components, a functional areas view 1502 and an integration model editor 1504. FIG. 15B shows adaptation pattern templates 1506 and adaptation pattern—parameter 1508 in more detail.

Functional areas view 1502 lists possible functions of the modeling tool that are required to cover the identified use cases (e.g., those shown FIG. 14). The functions include but are not limited to the following functions:

Load Application Extensibility Description 410
Load Service Description 412
Load Integration Design 416
Create Integration Design 416
Browse Adaptation Pattern Library
Browse/Search Models of Application Extensibility-, Service- and integration Descriptions)
Use Recommendation Support
Check Consistency
Generate integration Description 418

Integration model editor 1504 shows on the left-hand side the loaded application extensibility description 410 and on the right-hand side the loaded service description 412. In the middle-part the service integration design 416 is shown. Also, available adaptation pattern templates can be selected in an adaptation pattern pane 1506, dropped into the modeling pane of integration design 416 and linked with elements from application extensibility description 410 and service description 412. Optionally additional parameters can be specified for an adaptation pattern in an adaptation pattern parameter pane 1508.

As can be seen in the sample integration design 416, one complex adaptation pattern 600 and one atomic adaptation pattern 500 are used to link elements of application extensibility description 410 with elements of service description 412. These connections are described in FIG. 8.

Different colors may be used to indicate status of the connections to a user. The colors are not explicitly shown in FIG. 15 but it is understood that an interface could display the different colors. For example, green ports indicate that the port is successfully linked to elements of application extensibility description 410 or service description 412. Red ports indicate that the port of the adaptation pattern has so far not been successfully connected. Orange ports with dotted connection lines indicate suggestions from a recommendation engine (described in more detail below) to connect so far unconnected ports with elements of application extensibility description 410 or service description 412.

Architecture

Figure 16:
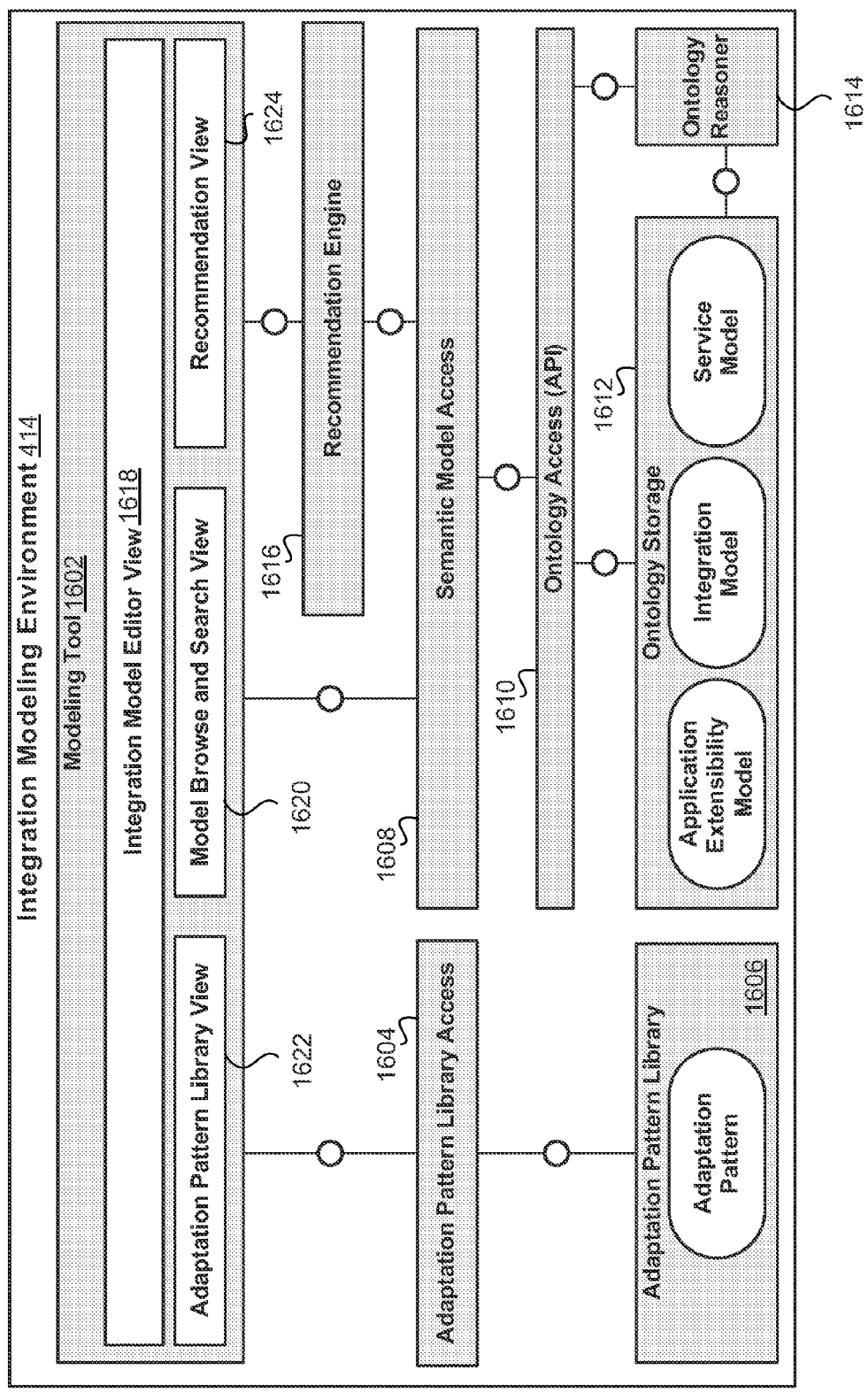
FIG. 16 shows the architecture of the integration modeling environment according to one embodiment.

FIG. 16 shows the architecture of integration modeling environment 414 according to one embodiment. Integration modeling environment 414 includes the following main components: (1) modeling tool 1602, (2) adaptation pattern library access 1604 and adaptation pattern library 1606, (3) semantic model access 1608, (4) ontology access API 1610 with ontology storage 1612 and ontology reasoner 1614 and (5) recommendation engine 1616.

Modeling tool 1602 is the primary user interface of the overall integration modeling environment 414. Modeling tool 1602 offers an integration model editor view 1618 to display all data of application extensibility description 410, service description 412, and integration design 416 to the user and allow for modifications of integration design 416 by the user. All three designs can also be separately browsed within a model browse and search view 1620 to access all information stored in these models directly and to provide navigation support for identifying possible adaptation capabilities of the business application or the service. An adaptation pattern library view 1622 offers functionality to browse, inspect, select and load adaptation patterns stored in the underlying adaptation pattern library 1606.

Semantic models (application extensibility description 410, integration design 416, and service description 412) are managed by semantic model access 1608 component. Application extensibility description 410 contains semantic information about the adaptation and extension capabilities of business application 208 specified as an ontology. Service description 412 stores semantic information about the service as an ontology. Integration design 416 is the central data model of integration modeling environment 414 and in an ontology it stores all specification data for the integration of the external service into the given enterprise application systems.

Internally, semantic model access 1608 relies on ontology access API 1610 to access (a) ontology storage 1612 where the semantic models are stored as ontologies, and (b) ontology reasoner 1614, which provides functionality to perform ontological reasoning over all three semantic models in ontology storage 1612.

Recommendation engine 1616 provides support for the user with his/her task to define the integration details within integration modeling environment 414. Recommendation engine 1616 (e.g., as a backend system) evaluates the current data in semantic models and integration design 416 with current instances of adaptation patterns that might or might not be connected to elements in application extensibility description 410 or service description 412. Recommendation engine 1616 further takes all currently applicable adaptation patterns into account. For that purpose, recommendation engine 1616 relies on ontology reasoner 1614 to perform reasoning over ontologies stored in ontology storage 1612.

All recommended integration actions or opportunities are displayed to the user of modeling tool 1602 (for example, in a recommendation view 1624, or in the other views as well). Recommendation engine 1616 addresses the uncertainty in the course of the integration process and helps the user with recommendations for possible next integration actions or possible integration opportunities. The recommendation is based on the idea that with the ongoing progress of the integration process during the time, the initially very large set of possible next actions or integration opportunities can be significantly reduced after some early decisions have been made. Of course, these early decisions could be changed at any time and then the set of actions has to be widened again.

Figure 17:
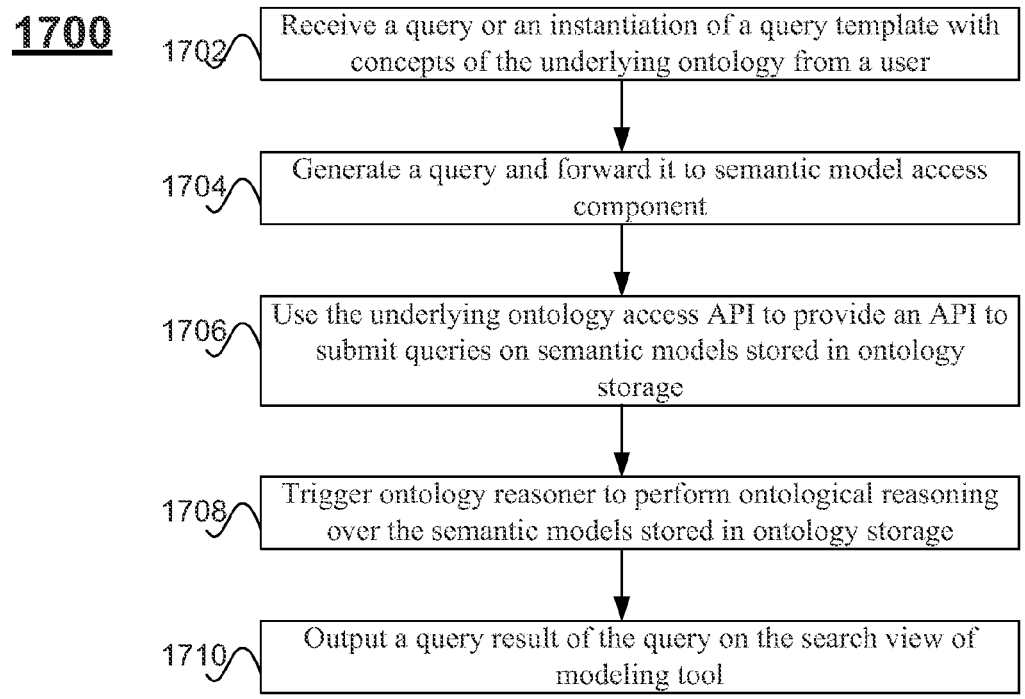
FIG. 17 shows a simplified flowchart for outlining the interactions between the components of the integration modeling environment when the model search view is used to search for semantic models according to one embodiment.

FIG. 17 shows a simplified flowchart 1700 for outlining the interactions between the components of integration modeling environment 414 when the model search view is used to search for semantic models according to one embodiment. At 1702, integration modeling environment 414 receives a query or an instantiation of a query template with concepts of the underlying ontology from a user. The query or instantiation may be received from model search view 1622.

At 1704, modeling tool 1602 generates a query and forwards it to semantic model access component 1608. At 1706, semantic model access component 1608 uses the underlying ontology access API 1610, which provides an API to submit queries on semantic models stored in ontology storage 1612.

At 1708, ontology access API 1610 triggers ontology reasoner 1614, which performs ontological reasoning over the semantic models stored in ontology storage 1612. At 1710, a query result of the query is output on the search view of modeling tool 1602.

Figure 18:
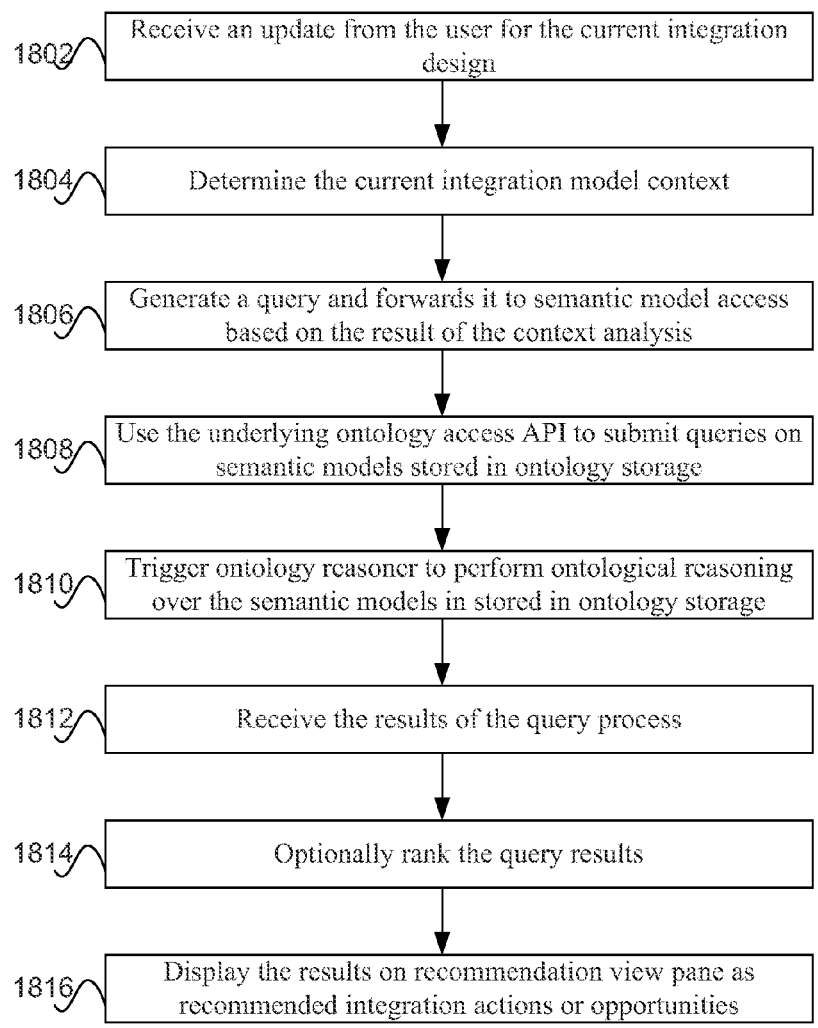
FIG. 18 depicts a simplified flowchart of a method used to support a user during service integration modeling according to one embodiment.

FIG. 18 depicts a simplified flowchart 1800 of a method used to support a user during service integration modeling according to one embodiment. At 1802, modeling tool 1602 of integration modeling environment 414 receives an update from the user for the current integration design 416. At 1804, recommendation engine 1616 determines the current integration model context. For example, recommendation engine 1616 analyzes the current context of integration design 416 (using the loaded application extensibility description 410 and service description 412). The selected and parameterized adaptation patterns including connected/unconnected application reference and service reference ports, available adaptation pattern templates may be analyzed.

At 1806, based on the result of the context analysis, recommendation engine 1616 generates a query and forwards it to semantic model access 1618. At 1808, semantic model access 1618 uses the underlying ontology access API 1610 to submit queries on semantic models stored in ontology storage 1612. At 1810, ontology access API 1608 triggers ontology reasoner 1614, which performs ontological reasoning over the semantic models in stored in ontology storage 1612.

At 1812, recommendation engine 1616 receives the results of the query process. At 1814, recommendation engine 1616 optionally ranks the query results. At 1816, modeling tool 1602 displays the results on recommendation view pane 1624 as recommended integration actions or opportunities. Optionally, the result may be rendered in other views of modeling tool 1602, e.g., potential connections between so far unconnected port of adaptation pattern instances and elements of application extensibility description 410 or service description 412 might be inserted with a dotted line. The user can see the recommendations and decide to select and implement one. After the integration design is edited/changed by the user, recommendation engine 1616 may be triggered again with a changed context (semi-automatic modeling guidance support).

User Interaction Process

The following describes the user interaction process for service integrator 404 with respect to service integration modeling environment 414. The overall user interaction process comprises five phases, namely (I.) Integration Setup Phase, (II.) Pattern Instantiation and Connection Phase, (III.) Pattern Parameterization Phase, (IV.) Integration Design Check Phase, and (V.) Integration Design Export Phase.

Figure 19:
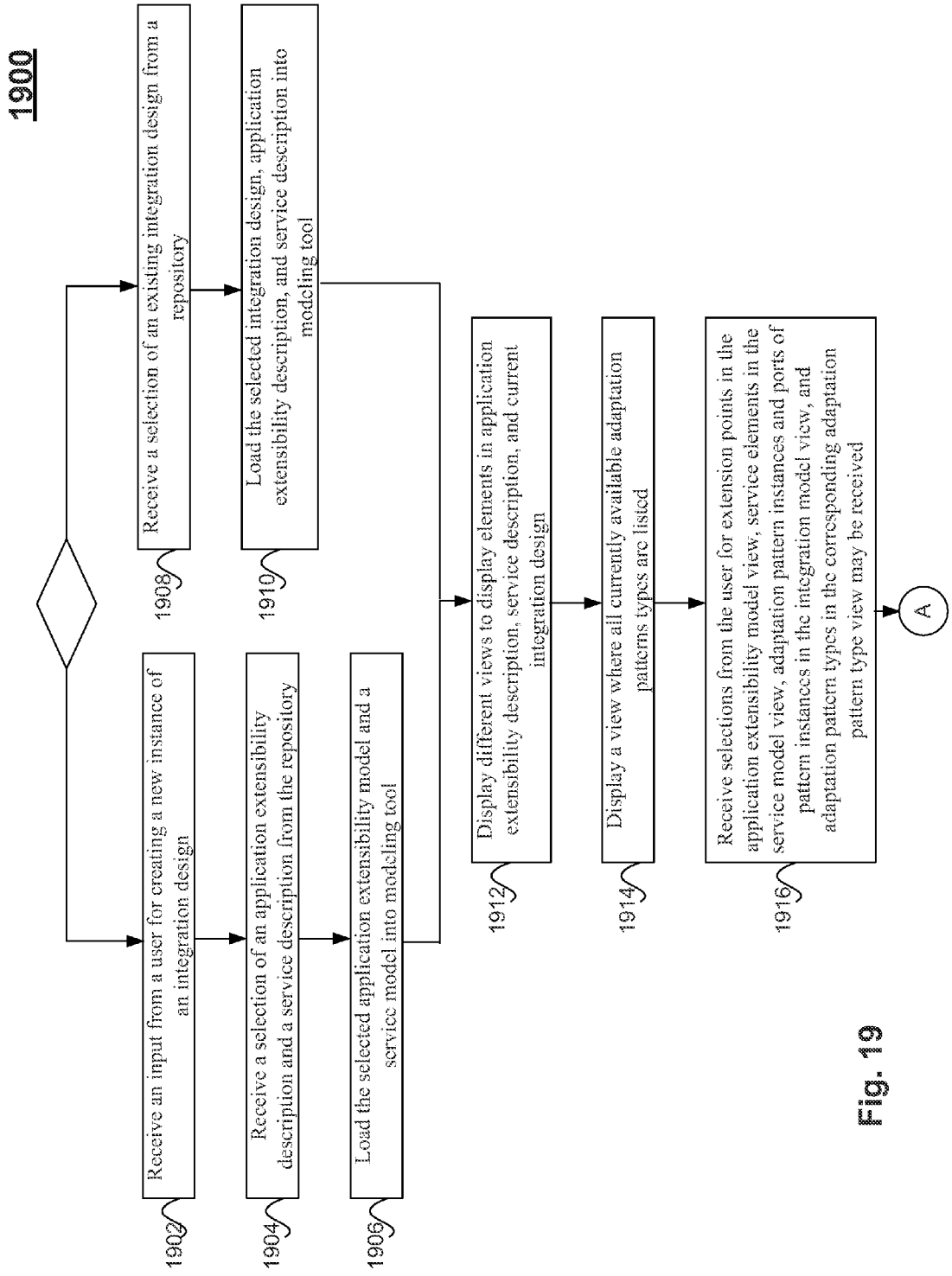
FIG. 19 depicts a simplified flowchart of a method for the integration setup phase according to one embodiment.

FIG. 19 depicts a simplified flowchart 1900 of a method for the integration setup phase according to one embodiment. In a first path, at 1902, integration modeling environment 414 receives an input from a user for creating a new instance of an integration design 416. At 1904, integration modeling environment 414 receives a selection of an application extensibility description 410 and a service description 412 from the repository. At 1906, integration modeling environment 414 loads the selected application extensibility description 410 and service description 412 into modeling tool 1602.

Alternatively, in a second path, an existing integration design 416 may be used. In this case, at 1908, integration modeling environment 414 receives a selection of an existing integration design 416 from a repository. At 1910, the selected integration design 416 as well as application extensibility description 410 and service description 412 referenced in integration design 416 are then loaded into modeling tool 1602.

After either of the two paths, at 1912, modeling tool 1602 displays different views to display elements in application extensibility description 410, elements in service description 412, and elements of the current integration design 416. At 1914, modeling tool 1602 also displays a view where all currently available adaptation patterns types are listed. The user can browse the content of all views and select elements in all views. For example, at 1916, selections from the user for extension points in the application extensibility model view, service elements in the service model view, adaptation pattern instances and ports of pattern instances in the integration model view, and adaptation pattern types in the corresponding adaptation pattern type view may be received. The process then proceeds to A, described in FIG. 20.

Figure 20:
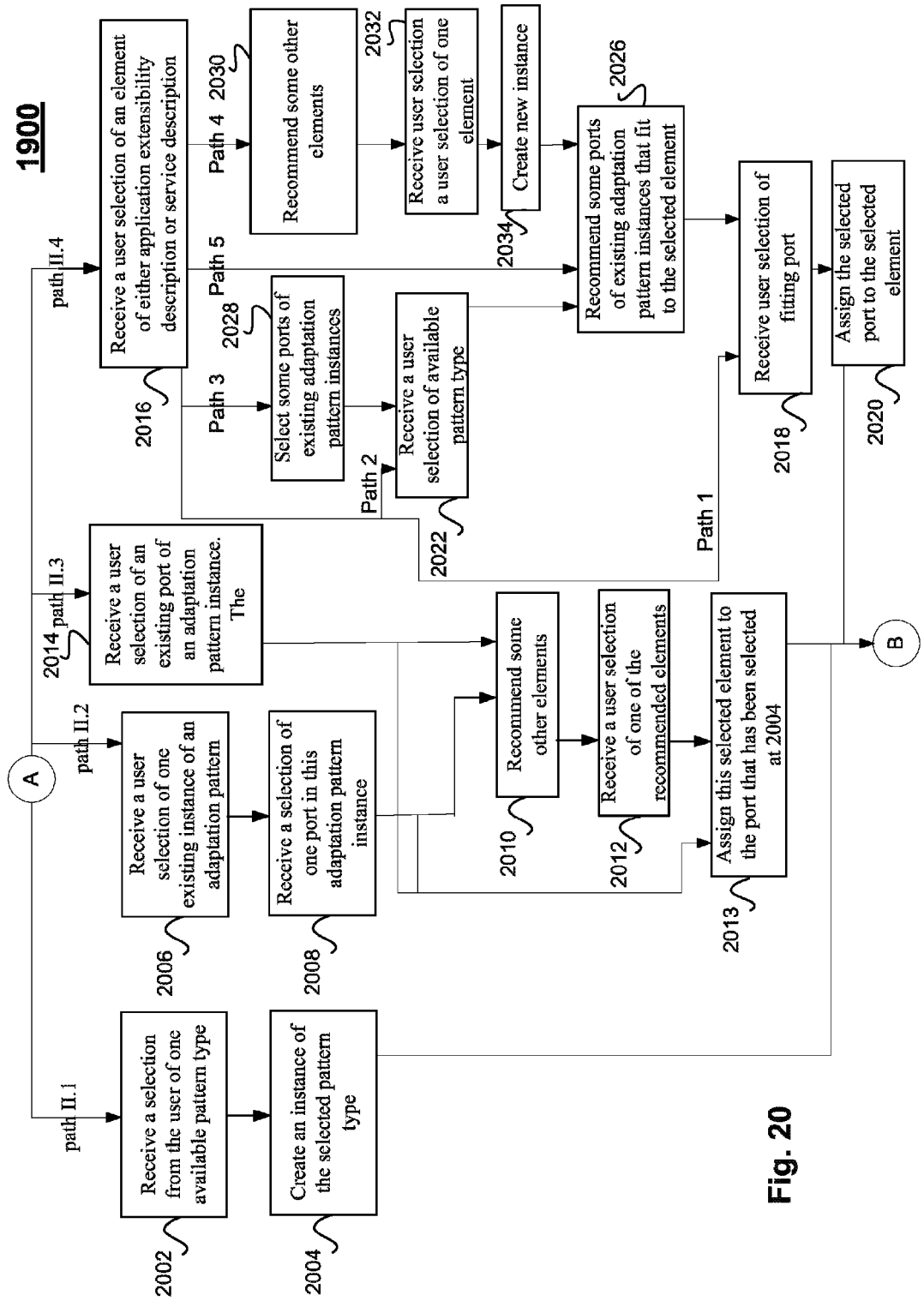
FIG. 20 depicts a simplified flowchart of a method for pattern instantiation and connection according to one embodiment.

After the setup, in a second phase of "pattern instantiation and connection" the user can choose one of four different interaction paths by either selecting a pattern type (path II.1), a pattern instance (path II.2), a port of a pattern instance (path II.3), or an element of application extensibility description 410 and a service description 412 (i.e. extension points) (path II.4). FIG. 20 depicts a simplified flowchart 2000 of a method for pattern instantiation and connection according to one embodiment. In path II.1, at 2002, modeling tool 1602 receives a selection from the user of one available pattern type (in the adaptation pattern type view). At 2004, modeling tool 1602 creates an instance of the selected pattern type.

In path II.2, at 2006, modeling tool 1602 receives a user selection of one existing instance of an adaptation pattern (in the integration model view). At 2008, in modeling tool 1602, a user selection of one port in this adaptation pattern instance is received. In one example, the process may proceed to 2013. In another example, at 2010, modeling tool 1602 recommends some other elements—either from application extensibility description 410 or service description 412—that fit to the selected port with respect to a set of fitness criteria. At 2012, modeling tool 1602 receives a user selection of one of the recommended elements (or another one freely chosen by the user). At 2013, modeling tool 1602 assigns this selected element to the port that has been selected at 2004.

In path II.3, at 2014, modeling tool 1602 receives a user selection of an existing port of an adaptation pattern instance.

In one example, the process may proceed to 2013. In another example, the process then proceeds to 2010 and 2012, described above.

In path II.4, at 2016, modeling tool 1602 receives a user selection of an element of either application extensibility description 410 or service description 412 (i.e., an extension point). In this case, five alternative sub-paths are possible:

In a first path, at 2018, modeling tool 1602 receives a user selection of one port of an arbitrary adaptation pattern instance that fits to the selected element. At 2020, modeling tool 1602 then assigns the selected port to the selected element.

In a second path, at 2022, modeling tool 1602 receives a user selection of one of the available pattern types. At 2026, modeling tool 1602 may then recommend some ports of existing adaptation pattern instances that fit to the element selected at 2016. At 2018, modeling tool 1602 receives a user selection of one port of an arbitrary adaptation pattern instance that fits to the selected element. At 2020, modeling tool 1602 assigns the selected port to the selected element.

In a third path, at 2028, modeling tool 1602 selects some ports of existing adaptation pattern instances that fit to the selected element. At 2018, a user selection of one of these recommended ports or a selection of an arbitrary port from an existing adaptation pattern instance is received. At 2026, modeling tool 1602 may then recommend some ports of existing adaptation pattern instances that fit to the element selected. At 2018, modeling tool 1602 receives a user selection of one port of an arbitrary adaptation pattern instance that fits to the selected element. At 2020, modeling tool 1602 assigns the selected port to the selected element.

In a fourth path, at 2030, modeling tool 1602 recommends some other elements (from application extensibility description 410 or service description 412). The recommended elements fit the initially selected element to some ports of existing adaptation pattern instances in integration design 416. At 2032, a user selection of one element (either one of the recommended elements or the initially selected element) is received and at 2034 modeling tool creates a new instance of the selected element. The process then proceeds to 2026, 2018, and 2020.

In a fifth path, modeling tool 1602, recommend some ports of existing adaptation pattern instances that fit to the selected element. The process then proceeds to 2026, 2018, and 2020.

After having followed one of these paths of the second phase, the user can decide to either follow one of these interaction paths again or to proceed to the next phases of pattern parameterization, pattern instantiation and connection, and integration design export. The method then proceeds to B at in FIG. 21.

Figure 21:
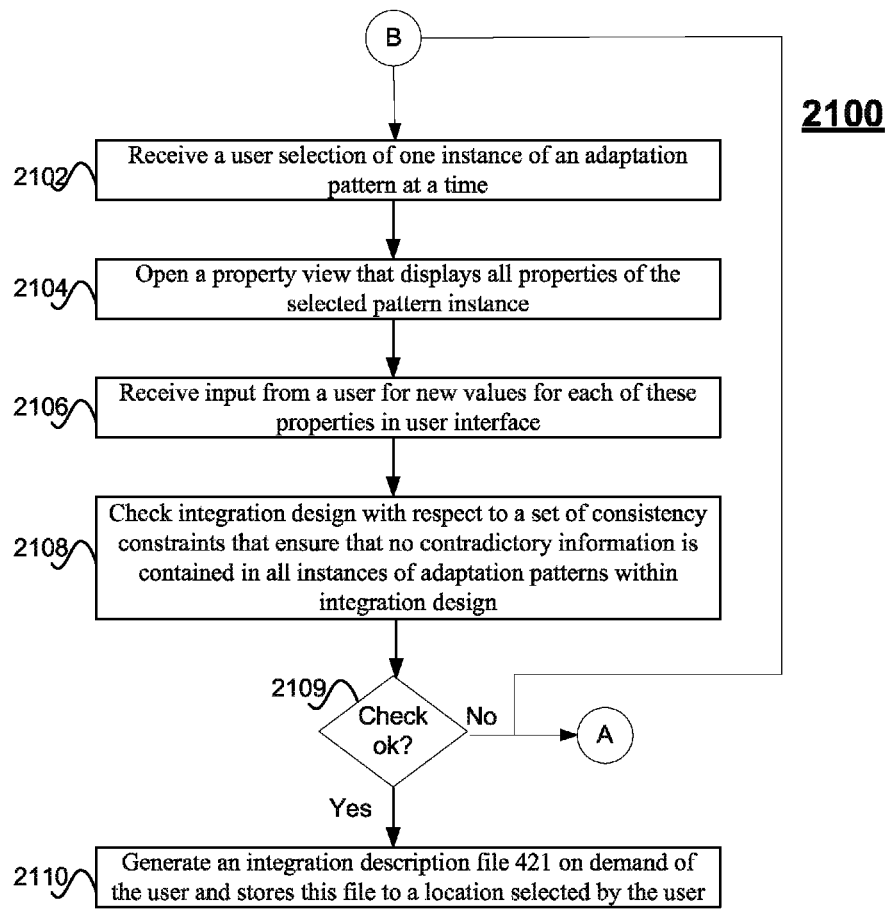
FIG. 21 depicts a simplified flowchart of a method for performing the next phases of pattern parameterization, pattern instantiation and connection, and integration model export according to one embodiment.

FIG. 21 depicts a simplified flowchart 2100 of a method for performing the next phases of pattern parameterization, pattern instantiation and connection, and integration design export according to one embodiment. At 2102, in the third phase pattern parameterization, a user selection of one instance of an adaptation pattern at a time is received. At 2104, modeling tool 1602 opens a property view that displays all properties of the selected pattern instance. At 2106, input from a user for new values for each of these properties is received in user interface. After completion of the parameterization of an adaptation pattern instance, the user can either decide to parameterize another adaptation pattern instance, the user can decide to proceed with following one of the paths of the preceding phase "pattern instantiation and connection", or the user can decide to proceed to the next phase "integration model check".

At 2108, in the fourth phase pattern instantiation and connection, modeling tool 1602 checks integration design 416 with respect to a set of consistency constraints that ensure that no contradictory information is contained in all instances of adaptation patterns within integration design 416. From this phase, at 2109, the process can go back to the beginning to the third phase (B) or the second phase (A) if the consistency check is valid or not. If the checks are passed successfully, the fifth phase "integration model export" can be entered.

At 2110, in the fifth phase integration model export, modeling tool 1602 generates an integration description file 418 on demand of the user and stores this file to a location selected by the user (e.g., in a file system).

Example for User Interaction Process

The following describes the service integration modeling of the Eco Calculator scenario described above by applying the adaptation pattern examples introduced above. The scenario includes the usage of one atomic adaptation pattern 500 and one complex adaptation pattern 600 of four atomic adaptation patterns as shown in FIG. 8. For discussion purposes, the integration modeling approach is described without the guidance support of recommendation engine 1616; however, recommendations may be provided in other examples. The following actions may be performed automatically or in response to user input:

1. load application extensibility description 410 for target enterprise system 202 into the integration modeling environment 414.
2. load service description 412 into integration modeling environment 414.
3. create a new integration design 416.
4. select the complex adaptation pattern type "Stateless UI Service integration without data persistency" from the adaptation pattern type list and display in the integration model editor. This pattern includes four atomic adaptation patterns: (i) addButton, (ii) addTableColumn, (iii) addDataMeditator and (iv) addDataMediator. Modeling tool 1602 creates a new instance of the adaptation pattern.
    a. select adaptation pattern instance: addButton
        i. connect the application reference port B1 (port type Extension Point Type—Button Panel) with the extension point BP-EP#1 of the application extensibility model.
        ii. connect the service reference port B2 with the Default User Interface section of the service model in order to obtain the proposed text for the new button. The user might overwrite this parameter, e.g., by another name.
        iii. connect the service reference port B3 with the service operation "calculateEcoValue" from the service model. This parameter is used to indicate, which operation of the service model should be called, when the button is pressed (event handler).
        iv. If all entries are set, check consistency of the atomic pattern instance. If consistency is detected, then consistency attribute is set to true for this pattern instance. Modeling tool 1602 evaluates if this consistency attribute change propagates into other entities of integration design 416.
    b. select adaptation pattern instance: addTableColumn
        i. connect the application reference port C1 (port type Extension Point Type—Table) with the extension point EP—T-EP#2.
        ii. connect the service reference port C2 with the Default User Interface section of the service model in order to obtain the proposed name for the table column. The user might overwrite this parameter, e.g., by another name.

iii. connect the service reference port C3 with the output parameter "Eco Values" of the output interface of the service operation "calculateEcoValue". A user definition of which data of the service is shown in the additional table column.

iv. If all entries are set, modeling tool 1602 checks consistency of the atomic pattern instance. If consistency is detected, then consistency attribute is set to true for this pattern instance. Modeling tool 1602 evaluates if this consistency attribute change propagates into other entities of integration design 416.

c. select adaptation pattern instance: addDataMediator i. connect the application reference port D1 with the export data interface of UI component UC1 of application extensibility description 410.

ii. connect the service reference port D2 with the input interface of the service operation "calculateEcoValue".

iii. receive selection on the pattern instance in order to open a data mapping view that allows the user to define the data mapping between the selected interfaces. After the mapping is defined the data mapping view may be closed.

iv. If all entries are set, modeling tool 1602 checks consistency of the atomic pattern instance. If consistency is detected, then consistency attribute is set to true for this pattern instance. Modeling tool 1602 evaluates if this consistency attribute change propagates into other entities of integration design 416.

d. select adaptation pattern instance: addDataMediator i. connect the application reference port E1 with the import data interface of UI component UC1 of application extensibility description 410.

ii. connect the service reference port E2 with the output interface of the service operation "calculateEcoValue".

iii. receive selection on the pattern instance in order to open a data mapping view that allows the user to define the data mapping between the selected interfaces. After the mapping is defined the data mapping view may be closed.

iv. If all entries are set, modeling tool 1602 checks consistency of the atomic pattern instance. If consistency is detected, then consistency attribute is set to true for this pattern instance. Modeling tool 1602 evaluates if this consistency attribute change propagates into other entities of integration design 416.

e. If all entries are set, modeling tool 1602 checks consistency of the complex pattern instance. If consistency is detected, then consistency attribute is set to true for this pattern instance. Tool evaluates if this consistency attribute change propagates into other entities of integration design 416.

5. select the adaptation pattern type "addOutputField" from the adaptation pattern type list and display the integration model editor. Modeling tool 1602 creates a new instance of the adaptation pattern.

a. select adaptation pattern instance and connect the application reference port F1 (port type Extension Point Type—Panel) with the extension point EP—P-EP#3.

b. connect the service reference port F2 with the Default User Interface section of the service model in order to obtain the proposed text for the output field. The user might overwrite this parameter, e.g., by another name.

c. connect the service reference port F3 with the output parameter "Eco Value" of the output interface of the service operation "calculateEcoValue". A user definition of which data of the service is shown in the additional output field d. If all entries are set, modeling tool 1602 checks consistency of the atomic pattern instance. If consistency is detected, then consistency attribute is set to true for this pattern instance. Modeling tool 1602 evaluates if this consistency attribute change propagates into other entities of integration design 416.

6. If all adaptation pattern instances are parameterized, modeling tool 1602 checks the consistency of integration design 416. If consistency is detected, then consistency attribute is set to true for this integration design 416. Afterwards an integration description can be generated.

Runtime—Extension/Adaptation Execution Environment

The following will describe the runtime environment after adaptation patterns have been instantiated and parameterized.

Architecture

Figure 22:
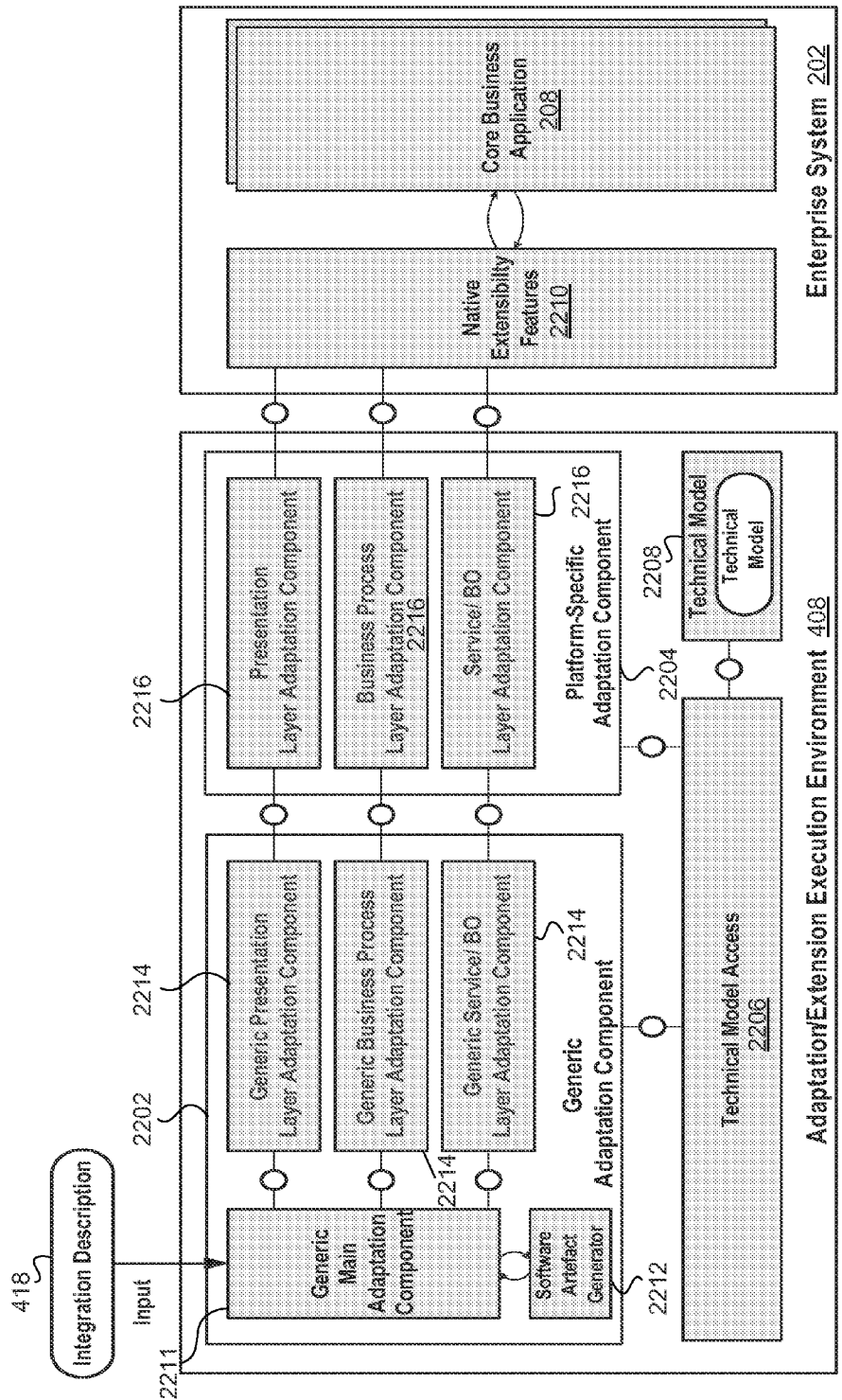
FIG. 22 shows an example of an architecture of an adaptation/extension execution environment according to one embodiment.

FIG. 22 shows an example of an architecture of adaptation/extension execution environment 408 according to one embodiment. Adaptation/extension execution environment 408 that includes the following components: (1) generic adaptation component 2202, (2) platform-specific adaptation component 2204 and (3) technical model access 2206 with technical model storage 2208. These components and their interrelations are described in addition to the interaction with native extensibility features 2210 (e.g., native APIs) of enterprise system 202.

Generic adaptation component 2202 is overall responsible for the execution of the service integration. Generic main adaptation component 2211 imports a given integration description 418 (generated by service integration modeling environment 414) and controls a number of layer-specific adaptation components as well as a software artifact generator. In one embodiment, generic adaptation component 2202 provides general adaptation functionality and is independent of the concrete target enterprise system 202. Layer adaptation components 2214 are parameterized with data extracted from integration description 418. Integration description 418 can additionally contain data from which new software artifacts could be generated. For example, platform-specific files can be generated like user interface dialogs, help dialogs or configuration files. In one example, a software artifact generator 2212 generates the desired artifacts and stores them in via technical model access 2206 component with the technical model repository. They are used, e.g., by the layer adaptation subsystems 1214 when needed.

Platform-specific adaptation component 2204 is responsible for actually executing the adaptation/extension steps by using native extensibility features 2210 of target enterprise system 202 (e.g., by deploying additional software artifacts, registering native extension artifacts. Platform-specific adaptation component 2204 includes dedicated adaptation components 2216 that are responsible for carrying out the desired adaptation steps with respect to a given layer of enterprise system 202. For example, the layers are the presentation layer, business process layer, and the service/BO layer. For each application layer, a specific adaptation component 2216 is available with a generic part and a platform-specific part. While generic adaptation component 2202 is instrumented with the generic integration description 418, the specific adaptation components 2216 directly access the found layer-specific platform engines, for example, a process execution system or a presentation platform-specific rendering system.

Technical model storage 2208 is a repository that stores all technical models that are required by adaptation/extension execution environment 408. It is managed and accessed by the technical model access 2206.

Integration Execution Process

Figure 23:
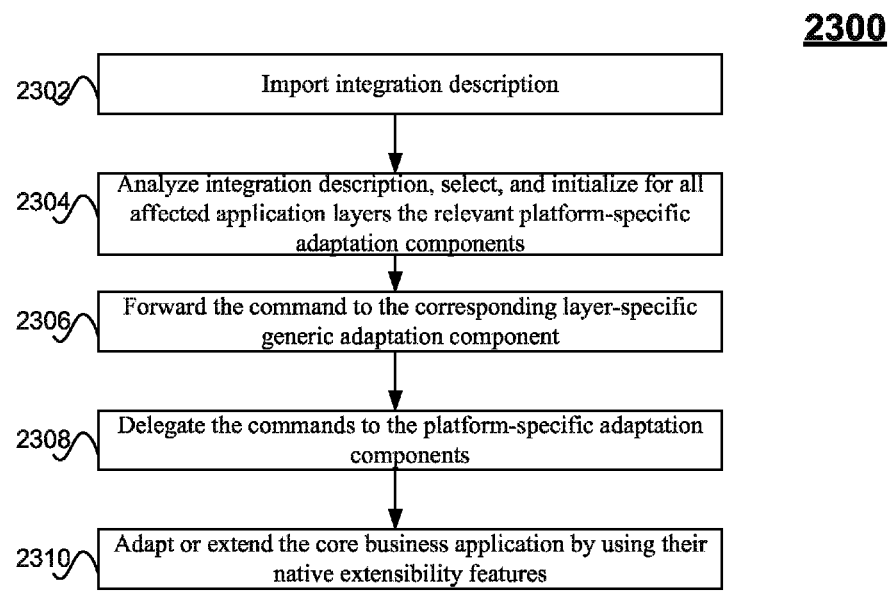
FIG. 23 shows a simplified flowchart of the integration execution process within the adaptation/execution environment according to one embodiment.

FIG. 23 shows a simplified flowchart 2300 of the integration execution process within adaptation/execution environment 408 according to one embodiment. The overall integration execution process comprises three phases: (I.) an integration description import phase, (II.) a generic adaptation component setup phase and (III.) a platform-specific integration execution phase.

In the "integration description import phase", at 2302, generic main adaptation component 2211 of adaptation/execution environment 408 imports integration description 418, which has been generated by integration modeling environment 414. Integration description 418 is also checked it for formal correctness.

In the "generic adaptation component setup phase", at 2304, generic main adaptation component 2211 analyzes integration description 418, selects, and initializes for all affected application layers the relevant platform-specific adaptation components.

In the "platform-specific integration execution phase", main generic adaptation component 2211 iterates on all adaptation/extension commands that are contained in integration description 418. At 2306, for each command main generic adaptation component 2211 forwards the command to the corresponding layer-specific generic adaptation component 2214. At 2310, layer-specific generic adaptation components 2214 delegate the commands to the platform-specific adaptation components 2216. At 2212, platform-specific adaptation components 2216 adapt or extend the core business application(s) 208 by using their native extensibility features 2210 (e.g., using native API or generating, registering extensions or generating and deploying platform-specific software artifacts). At 2214, after each execution of a command, the control is given back to generic main adaptation component 2211. If all commands are successfully, executed the integration execution process is finished.

Example for Integration Execution Process

Figure 24:
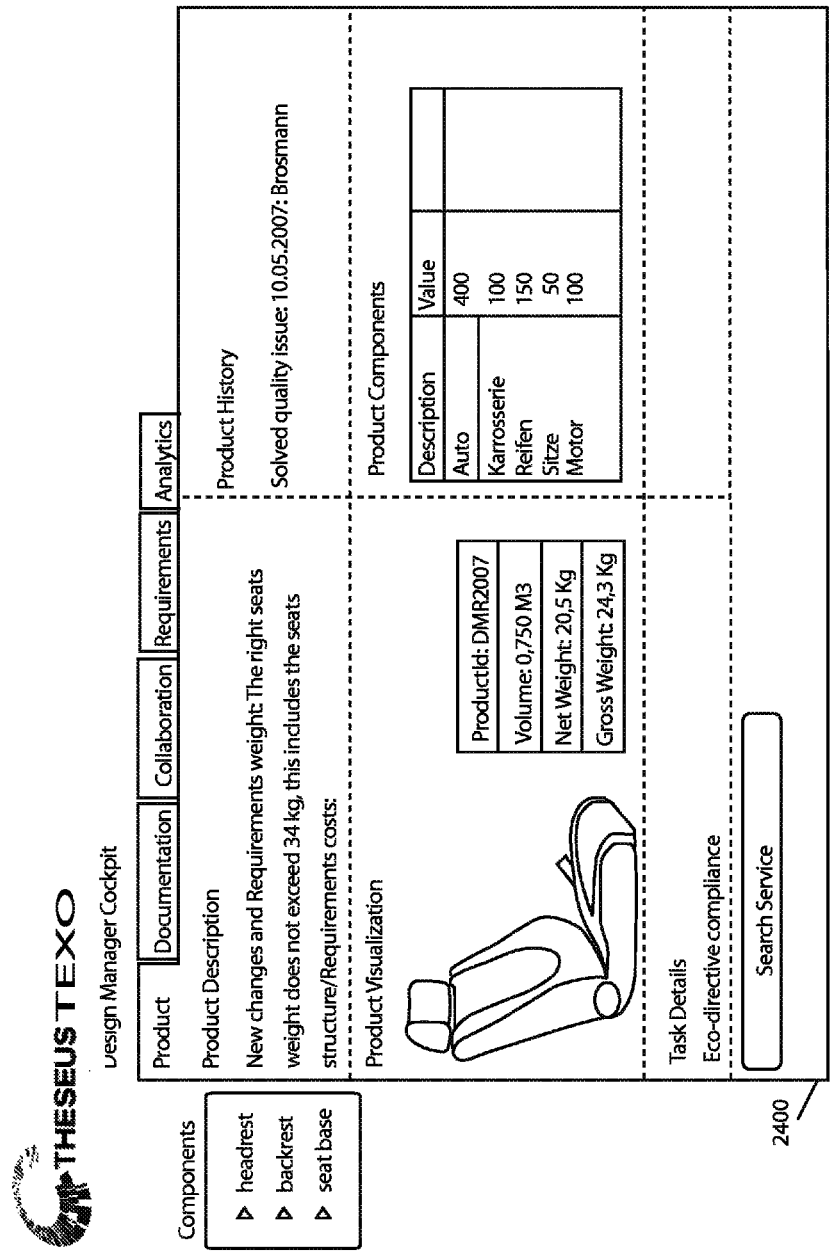
FIG. 24 depicts an interface of core business application before an Eco Calculator service has been integrated according to one embodiment.

The following is an example of user interfaces for the Eco-Calculator scenario introduced above. FIG. 24 depicts an interface 2400 of core business application 208 before the Eco Calculator service has been integrated according to one embodiment. This status of core business application 208 reflects the basic functionality of business application 208 that has been delivered, and shipped by the enterprise system provider (without the eco calculation functionality).

Figure 25:
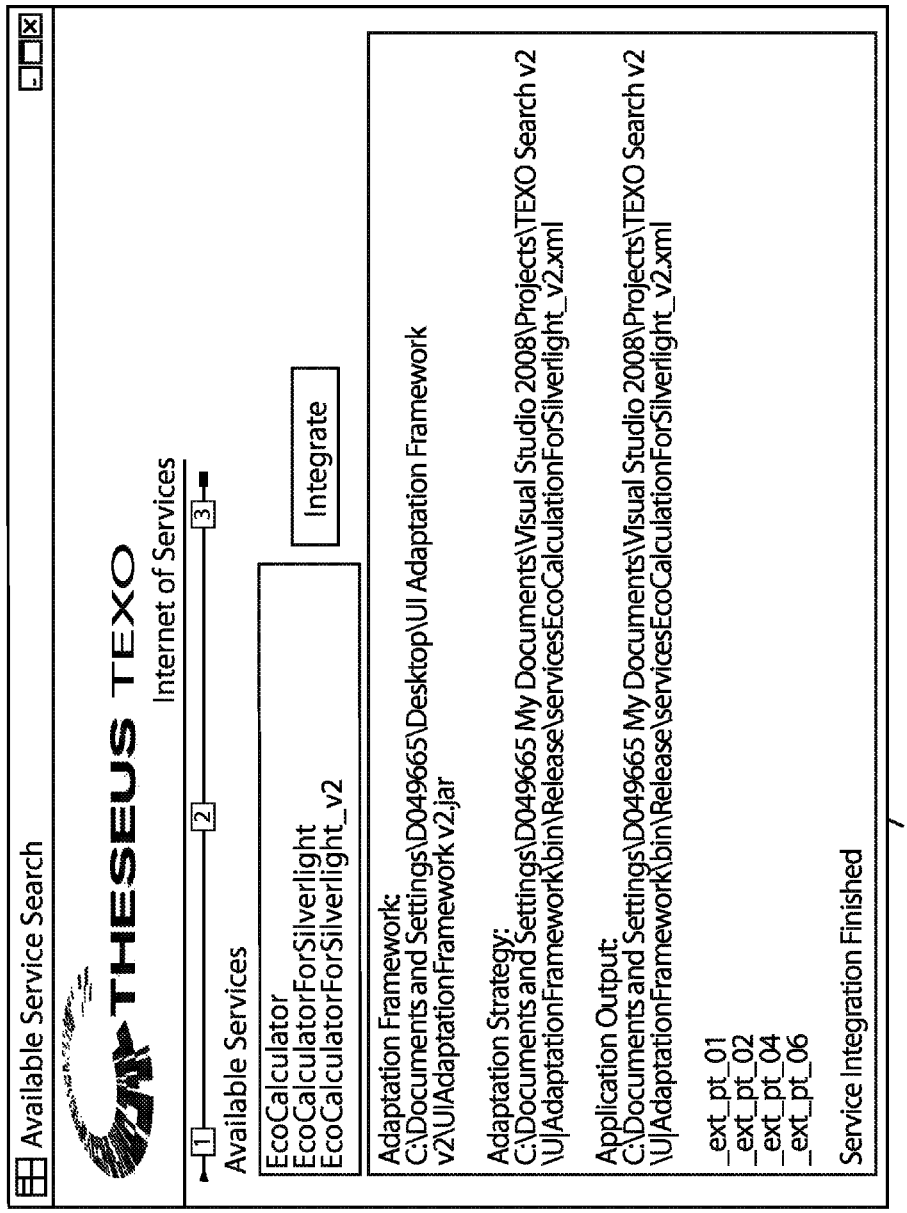
FIG. 25 depicts an interface that shows a dialog that is used by the service consumer to search for applicable services on the service marketplace according to one embodiment.

FIG. 25 depicts an interface 2500 that shows a dialog that is used by the service consumer to search for applicable services on the service marketplace according to one embodiment. When the user selects a service (e.g., certified for enterprise system 202), the service is automatically delivered and integrated on the target environment of the service consumer.

Figure 26:
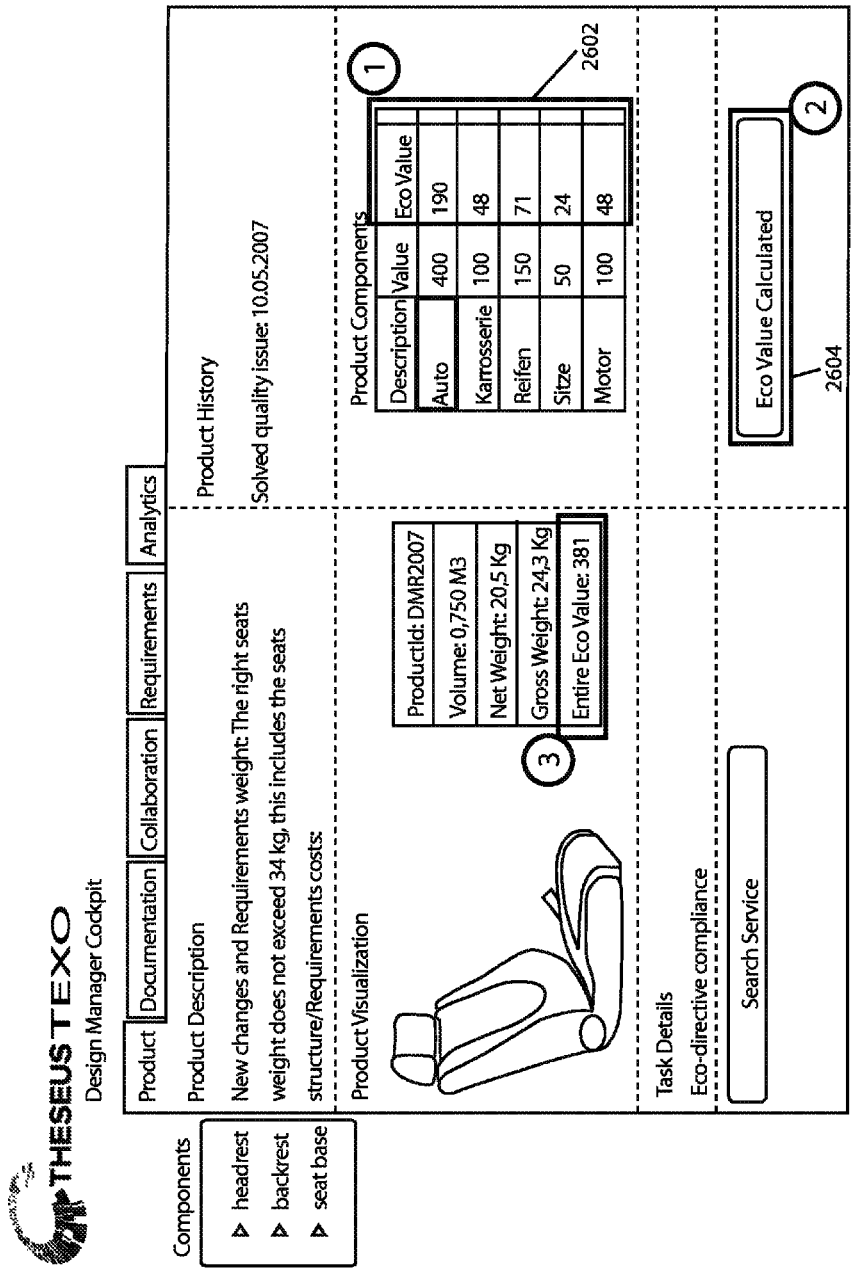
FIG. 26 depicts an interface that shows the core business application that has been extended with the Eco Calculation service according to one embodiment.

FIG. 26 depicts an interface 2600 that shows core business application 202 that has been extended with the Eco Calculation service according to one embodiment. During the integration of the service, core business application 202 is extended on the user interface layer with (1) an additional table column at 2602, (2) an additional button at 2604 and (3) an additional field at 2606. In addition two data mediators have been added to the target environment in order to map the data from the UI context to the service interface and vice versa.

Figure 27:
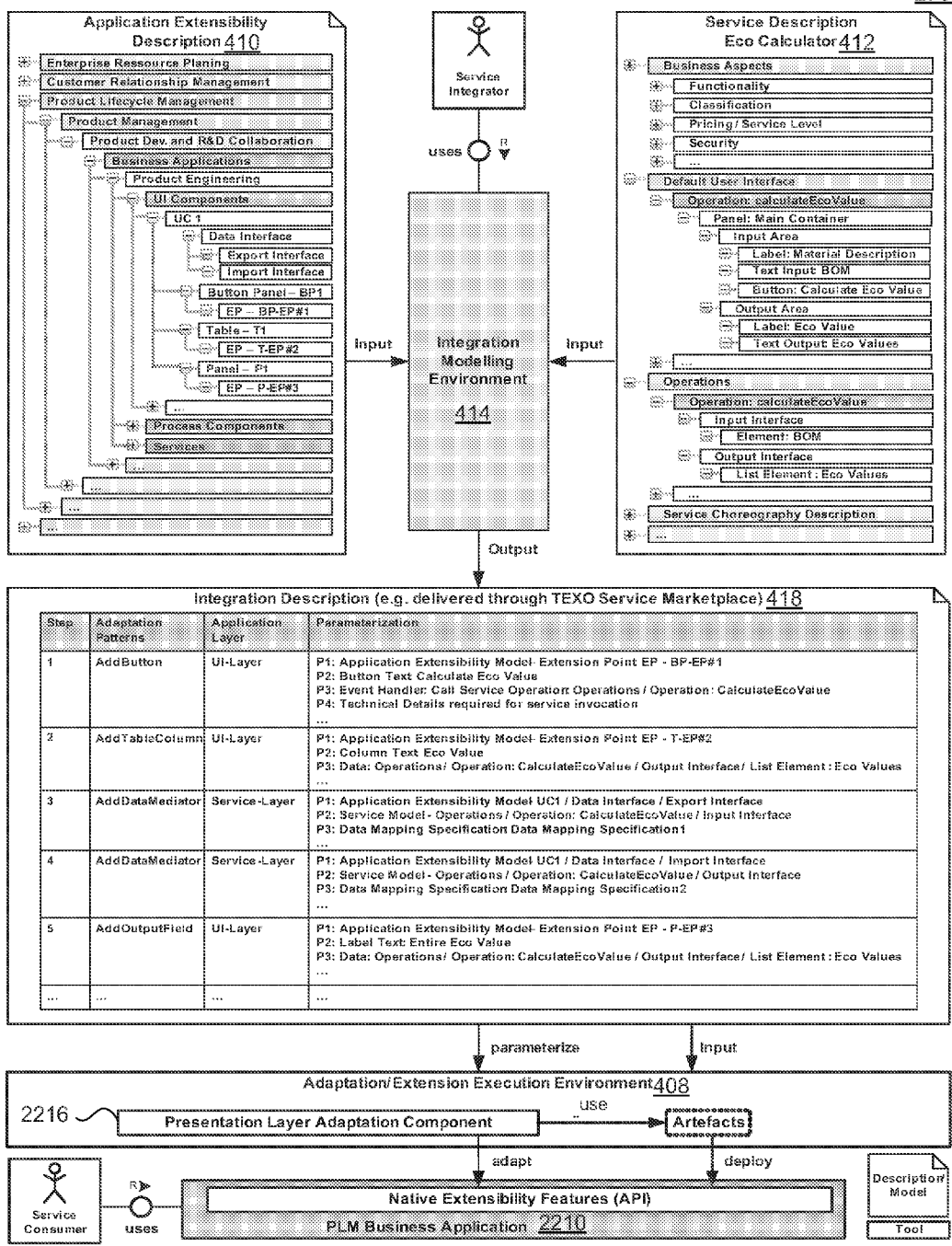
FIG. 27 shows an example of an architecture to execute the above extension according to one embodiment.

FIG. 27 shows an example of an architecture 2700 to execute the above extension according to one embodiment. Integration modeling environment 414 receives application extensibility description 410 and service description 412 as an input for the integration modeling task. Application extensibility description 410 and service description 412 are loaded into integration modeling environment 414.

The service integration defines the integration design based on the instantiation and parameterization of adaptation patterns and generates an integration description 418 out of it. Integration description 418 contains five parameterized adaptation patterns.

Adaptation/extension execution environment 408 is parameterized by integration description 418 (and the service description) and forwards it to presentation layer adaptation component 2216, which adapts business application 208 by reusing its native extensibility features 2210 (e.g., APIs).

Usage Scenarios

Two different usage scenarios for service integration framework 200 will be described but other scenarios may be appreciated.

Service Integration in (B2B)/(A2A) Scenarios (in (SaaS)/(PaaS) Environments)

In this usage scenario service integration framework 202 is used in the area of Business-2-Business (B2B) and Application-2-Application (A2A) integration scenarios in the context of enterprise systems 202. For example, if a service of a partner- or legacy solution has to be integrated into an enterprise system 202 that has not been foreseen by enterprise system 202, the service integration framework could be leveraged to integrate the service into the core enterprise system 202 by extending/adapting it on the required application layers.

As the enterprise software market faces a shift from on-premise to on-demand enterprise systems (Software-as-a-Service, SaaS), a simpler and more efficient integration of services becomes a major requirement as the SaaS subscribers do not employ highly specialized integration experts. Therefore service integration framework 200 could contribute to a Platform-as-a-Service (PaaS) environment to allow seamless integration of unforeseen services into a SaaS based enterprise system.

Service Integration in an Service Ecosystem Scenario

Figure 28:
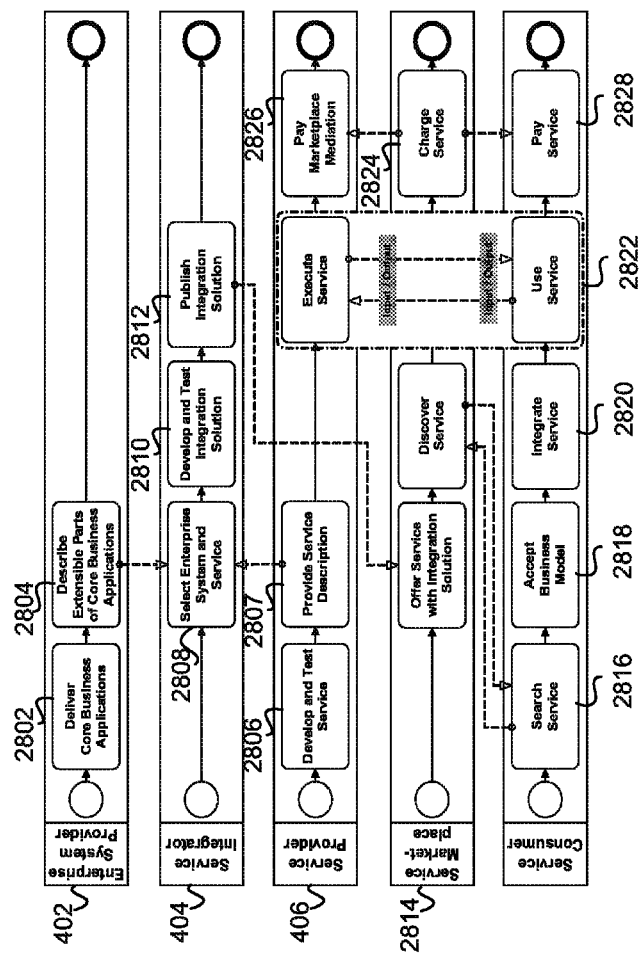
FIG. 28 shows an example of a service ecosystem according to one embodiment.

In this usage scenario, service integration framework 200 is used in the context of a service marketplace scenario as part of a service ecosystem. FIG. 28 shows an example of a service ecosystem according to one embodiment.

At 2802, an enterprise system provider 402 delivers standard business applications 208 running within enterprise systems 202. At the same time, these core business applications provide the capability to be flexibly adapted/extended at a later stage in the software-lifecycle. Therefore a description on how the core business applications can be extended on the relevant application layers is delivered at 2804.

At 2806, service provider 406 develops and tests a service, independent of the concrete service consumer environment. At 2807, service provider 406 provides the service description to service integrator 404.

At 2808, service integrator 404 is responsible for providing an integration solution for the combination of (i) a core business application 208 running within enterprise system 202 and (ii) a service, leveraging the extensibility features of the core enterprise system 202. At 2810, the integration solution is tested (and optionally certified by the enterprise system provider) and, at 2812, published on the service marketplace 2814 where it can be offered to a potential high number of service consumers.

At 2816, a service consumer can search for services offered on the service marketplace to extend his core business application provided by the enterprise system provider. At 2818, the business model is accepted. Instead of purchasing a plain service description and manually integrating the service into core business application(s) 208, at 2820, the service consumer can select the integration solution offered by the service integrator 404. At 2820, this solution allows the automatic adaptation/extension of core business application(s) 208 so that the service is fully integrated into enterprise system 202 and ready for usage. At 2822, the service may be executed and used.

At 2824, after the usage phase the service marketplace charges the service consumer for the service usage and, at 2826, the service provider for the brokering of the service. At 2828, the service consumer can pay for the service.

Advantages

Particular embodiments provide a service integration framework 200 that allows enterprise system providers to ship standard business applications and at the same time offer dedicated extensibility features that allows partners in a service ecosystem to seamlessly integrate new services at a later stage in the software lifecycle.

The following advantages are provided. An abstract model for the explicit description of the (i) adaptable/extensible parts of a business application 208 and (ii) the service to be integrated is defined. Extensibility features and extension points of business application 208 can be modeled on multiple application layers in a uniform way (presentation layer, business process layer, service layer and business configuration layer). Extension points on each of these layers are modeled using a common underlying meta model. Both models provide the basis for a service integration modeling approach.

A model-based service integration approach allows a user to model (or design) the relevant integration aspects in models (called integration design) by a service integrator 404. With the introduction of such a modeling approach the abstraction level in comparison to the abstraction level of programming languages is increased. For example, model checking, simulation, and design recommendation support is possible based on a model-based approach.

A pattern-driven modeling language for service integration allows a graphical representation of integration designs modeled with concepts and relations from the pattern-driven modeling language. Similar to the set of pre-defined adaptation patterns, the visual modeling language serves to establish a common and accepted terminology for service integration design. The visual language also serves as a communication means to express integration designs in graphical diagrams. Finally, integration experts can reduce their learning efforts because in general basically one single modeling language (plus possible enhancements for special cases) needs to be learned.

A controlled extensibility modeling approach for core business applications 208 is enabled insofar as only a proven set of integration operations can be performed to guarantee the integrity of core enterprise system 202. For this purpose, the pattern-driven modeling language provides modeling concepts for a set of typical adaptation- and extension tasks while integrating a service into core business application 208. A set of pre-defined atomic adaptation patterns is proposed which capture best-practice knowledge about frequent and relevant integration tasks. This set of patterns can be enhanced by modeling complex adaptation patterns that aggregate atomic adaptation patterns to capture complicated integration tasks.

The uniform pattern-driven integration modeling approach enables service integrators 404 to design the adaptation and extension of a core business application on more than one application layer (e.g., on presentation- and business process layer at the same time in the same adaptation pattern).

Recommendation engine 1616 helps service integrator 404 during modeling by analyzing the current context in the integration design model and e.g., suggesting next possible integration actions or possible integration opportunities. Through this component the required level of expertise of the service integrator is decreased and the degree of automation in the integration process of unforeseen services is increased.

Particular embodiments provide an increased level of abstraction by introducing a model-based service integration approach comprising of three central models:
  Abstract Application Extensibility Description 410
  Abstract Service Description 412
  Integration Design 416

Also, particular embodiments provide the introduction of a uniform integration modeling language by providing:
  a cross layer approach to model integration aspects on various application layers within an uniform modeling approach
  balance between platform-independent modeling approach and platform-specific system adaptation and extension.

A decreased level of expert knowledge is required, archived by:
  pattern-based modeling language
  easy to understand visual representation of the integration modeling language
  recommendation based modeling support for service integration modeling.

An increased degree of automation for service integration is achieved by:
  usage of adaptation patterns to enable pattern-specific code generation and/or system parameterization
  recommendation based modeling support for service integration modeling.

Particular embodiments process some models to adapt or extend a business application for the integration of a service.

Particular embodiments can import and parse integration description file 418 as a parameterization. Insofar integration description file 418 serves to decouple both designtime and runtime parts of service integration framework 200. Particular embodiments can control a set of adaptation sub-systems responsible that select and initialize for all affected application layers the relevant platform-specific adaptation components. Particular embodiments can create/generate new code or it can adapt/configure existing code (e.g. adapt/or extend the core business application(s) by using their native extensibility features (e.g. using native API or generating, registering extensions or generating or deploying platform-specific software artifacts)). Particular embodiments can create or modify device/platform-independent and/or device/platform-dependent entities or models (e.g. Extensible Application Markup Language (XAML) models, Business Process Execution Language (BPEL) models) that are used within model enactment/execution engines in the business application or enterprise system.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents may be employed without departing from the scope of the invention as defined by the claims.

What is claimed is:

1. A method for integrating a service into an application, the method comprising:
receiving an application extensibility description for an application, the application extensibility description including a set of application extension points;
receiving a service description for a service, the service description including a set of service elements;
receiving a specification of an integration design comprising a plurality of atomic adaptation patterns to link particular service elements in the service description to particular application extension points in the application extensibility description, wherein the plurality of atomic adaptation patterns define a plurality of steps for integrating the service into a plurality of application layers of the application, the application layers comprising a presentation layer, a business process layer, a service layer, and a configuration layer, and wherein each atomic adaptation pattern comprises one or more ports coupled to particular service elements in the service description and one or more ports coupled to particular application extension points in the application extensibility description;
generating, by a computing device, an integration description based on the integration design, wherein the integration description is used to execute integration of the application with the service;
generating a query for a recommendation for connecting an application extension point in the application extensibility description to a service element in the service description based on a context, the context being a state of the adaption/extension of the service into the application;
searching a semantic model to determine a search result indicating a recommended connection of an application extension point in the application extensibility description to a service element in the service description based on the query; and
changing the integration design based on the recommended connection.

2. The method of claim 1, wherein the application extensibility description comprises a representation of the application, wherein the set of application extension points designate points where the application is extendable.

3. The method of claim 1, wherein the service description comprises a representation of the service.

4. The method of claim 1, further comprising:
displaying the plurality of atomic adaptation patterns on a user interface.

5. The method of claim 1, further comprising:
receiving a query for a recommendation of a specification of an integration design; and
searching a semantic model to determine a search result indicating a recommended specification of an integration design, the search result determined based on the application extensibility description and the service description.

6. The method of claim 1, further comprising:
changing the generated integration description based on the changed integration design.

7. The method of claim 1, further comprising:
parsing the integration description to determine parameterized information, the parameterized information generated based on the integration design being connected to the first port and the service element being connected to the second port; and
adapting the application to extend it to use the service based on the parameterized information.

8. The method of claim 1, wherein the service description and application extensibility description include a set of models that define the set of application extension points and the set of service elements.

9. A computer system comprising:
one or more computer processors; and
a computer readable storage medium containing instructions that when executed by the one or more computer processors are operable to:
receive an application extensibility description for an application, the application extensibility description including a set of application extension points;
receive a service description for a service, the service description including a set of service elements;
receive a specification of an integration design comprising a plurality of atomic adaptation patterns to link particular service elements in the service description to particular application extension points in the application extensibility description, wherein the plurality of atomic adaptation patterns define a plurality of steps for integrating the service into a plurality of application layers of the application, the application layers comprising a presentation layer, a business process layer, a service layer, and a configuration layer, and wherein each atomic adaptation pattern comprises one or more ports coupled to particular service elements in the service description and one or more ports coupled to particular application extension points in the application extensibility description;
generate an integration description based on the integration design, wherein the integration description is used to execute integration of the application with the service;
generate a query for a recommendation for connecting an application extension point in the application extensibility description to a service element in the service description based on a context, the context being a state of the adaption/extension of the service into the application;
search a semantic model to determine a search result indicating a recommended connection of an application extension point in the application extensibility description to a service element in the service description based on the query; and
change the integration design based on the recommended connection.

10. The computer system of claim 9, wherein the application extensibility description comprises a representation of the application, wherein the set of application extension points designate points where the application is extendable.

11. The computer system of claim 9, wherein the service description comprises a representation of the service.

12. The computer system of claim 9, wherein the instructions are further operable to:
display the plurality of atomic adaptation patterns on a user interface.

13. The computer system of claim 9, wherein the instructions are further operable to:
receive a query for a recommendation of a specification of an integration design; and
search a semantic model to determine a search result indicating a recommended specification of an integration design, the search result determined based on the application extensibility description and the service description.

14. The computer system of claim 9, wherein the instructions are further operable to:
change the generated integration description based on the changed integration design.

15. The computer system of claim 9, wherein the instructions are further operable to:
parse the integration description to determine parameterized information, the parameterized information generated based on the integration design being connected to the first port and the service element being connected to the second port; and
adapt the application to extend it to use the service based on the parameterized information.

16. The computer system of claim 9, wherein the service description and application extensibility description include a set of models that define the set of application extension points and the set of service elements.

17. A non-transitory computer-readable storage medium containing instructions that when executed by a computer system are operable to:
receive an application extensibility description for an application, the application extensibility description including a set of application extension points;
receive a service description for a service, the service description including a set of service elements;
receive a specification of an integration design comprising a plurality of atomic adaptation patterns to link particular service elements in the service description to particular application extension points in the application extensibility description, wherein the plurality of atomic adaptation patterns define a plurality of steps for integrating the service into a plurality of application layers of the application, the application layers comprising a presentation layer, a business process layer, a service layer, and a configuration layer, and wherein each atomic adaptation pattern comprises one or more ports coupled to particular service elements in the service description and one or more ports coupled to particular application extension points in the application extensibility description;
generate an integration description based on the integration design, wherein the integration description is used to execute integration of the application with the service;
generate a query for a recommendation for connecting an application extension point in the application extensibility description to a service element in the service description based on a context, the context being a state of the adaption/extension of the service into the application;
search a semantic model to determine a search result indicating a recommended connection of an application extension point in the application extensibility description to a service element in the service description based on the query; and
change the integration design based on the recommended connection.

18. The non-transitory computer-readable storage medium of claim 17, wherein the instructions are further operable to:
change the generated integration description based on the changed integration design.

19. The non-transitory computer-readable storage medium of claim 17, wherein the instructions are further operable to:
parse the integration description to determine parameterized information, the parameterized information generated based on the integration design being connected to the first port and the service element being connected to the second port; and
adapt the application to extend it to use the service based on the parameterized information.

20. The non-transitory computer-readable storage medium of claim 17, wherein the service description and application extensibility description include a set of models that define the set of application extension points and the set of service elements.

\* \* \* \* \*